(12) United States Patent
Matsumura et al.

(10) Patent No.: US 9,579,884 B2
(45) Date of Patent: Feb. 28, 2017

(54) IMAGE FORMATION APPARATUS AND IMAGE FORMATION METHOD

(71) Applicant: SEIKO EPSON CORPORATION, Tokyo (JP)

(72) Inventors: Tetsuya Matsumura, Nagano (JP); Hirotaka Matsunaga, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 14/626,340

(22) Filed: Feb. 19, 2015

(65) Prior Publication Data

US 2015/0251410 A1    Sep. 10, 2015

(30) Foreign Application Priority Data

Mar. 5, 2014  (JP) ................................ 2014-042459

(51) Int. Cl.
| | |
|---|---|
| *B41J 2/205* | (2006.01) |
| *B41J 2/045* | (2006.01) |
| *B41J 2/21* | (2006.01) |
| *H04N 1/60* | (2006.01) |

(52) U.S. Cl.
CPC ............ *B41J 2/04501* (2013.01); *B41J 2/21* (2013.01); *H04N 1/6025* (2013.01)

(58) Field of Classification Search
USPC ................... 347/14, 15, 16, 19, 43, 5, 9, 12
See application file for complete search history.

(56) References Cited

U.S. PATENT DOCUMENTS

| | | | | |
|---|---|---|---|---|
| 6,084,604 A | * | 7/2000 | Moriyama | ............. B41J 2/2132 347/15 |
| 2001/0015734 A1 | * | 8/2001 | Kanda | ................. B41J 2/14056 347/15 |

FOREIGN PATENT DOCUMENTS

JP        2009-202491 A    9/2009

* cited by examiner

*Primary Examiner* — Lam Nguyen
(74) *Attorney, Agent, or Firm* — Global IP Counselors, LLP

(57) ABSTRACT

An image formation apparatus configured to form a monochrome image by discharging ink droplets on the basis of recording data from a plurality of nozzles having black nozzles for discharging black ink droplets and color nozzles for discharging color ink droplets that produce composite black, the image formation apparatus comprising a control unit configured to form the monochrome image by discharging the black ink droplets from the black nozzles and discharging the color ink droplets that produce composite black from the color nozzles when recording density of black ink represented by the recording data is a predetermined density or higher.

7 Claims, 16 Drawing Sheets

DEFAULT LUT1 (LUTk)

| R | G | B | C | M | Y | K | AMOUNT USED |
|---|---|---|---|---|---|---|---|
| 255 | 255 | 255 | 0 | 0 | 0 | 0 | 0% |
| ⋮ | ⋮ | ⋮ | 0 | 0 | 0 | ⋮ | ⋮ |
| 71 | 71 | 71 | 0 | 0 | 0 | 168 | |
| 62 | 62 | 62 | 0 | 0 | 0 | 171 | Tc% |
| ⋮ | ⋮ | ⋮ | 0 | 0 | 0 | ⋮ | ⋮ |
| 0 | 0 | 0 | 0 | 0 | 0 | 255 | 100% |

HIGH-COLORING LUT3 (LUTco)

| R | G | B | C | M | Y | K | AMOUNT USED |
|---|---|---|---|---|---|---|---|
| 255 | 255 | 255 | 0 | 0 | 0 | 0 | 0% |
| ⋮ | ⋮ | ⋮ | 0 | 0 | 0 | ⋮ | ⋮ |
| 71 | 71 | 71 | 0 | 0 | 0 | 168 | |
| 62 | 62 | 62 | 22 | 22 | 22 | 171 | Tc% |
| ⋮ | ⋮ | ⋮ | 43 | 43 | 43 | ⋮ | |
| 0 | 0 | 0 | 103 | 103 | 103 | 255 | 100% |

} LUTi

Fig. 10

DURING ONE-SIDED PRINTING

DURING TWO-SIDED PRINTING (PG2 > PG1)

IMAGE FORMATION APPARATUS AND IMAGE FORMATION METHOD

CROSS-REFERENCE TO RELATED APPLICATIONS

This application claims priority to Japanese Patent Application No. 2014-042459 filed on Mar. 5, 2014. The entire disclosure of Japanese Patent Application No. 2014-042459 is hereby incorporated herein by reference.

BACKGROUND

Technical Field

The present invention relates to an image formation apparatus and an image formation method.

Related Art

An inkjet printer, for example, causes a printing substrate (recording substrate) and a plurality of nozzles aligned side by size in a predetermined nozzle alignment direction to move in a relative fashion in a direction of scanning orthogonal to the nozzle alignment direction, and forms dots on the printing substrate by discharging ink droplets (liquid droplets) from the nozzles on the basis of recording data representative of whether or not there should be a dot for every pixel. In a case where a monochrome image is being formed on the printing substrate, black (K) ink droplets are discharged from black nozzles to form K dots on the printing substrate.

JP-A-2009-202491 (patent document 1) discloses an inkjet recording apparatus with which, when a black head is undergoing maintenance or a recovery operation out during printing, then printing is done by replacing the black dots with composite black dots and the black head undergoes the maintenance or recovery operation.

SUMMARY

Depending on the printing conditions, including the use of a printing substrate unlikely to produce ink bleeding, there sometimes occurs a phenomenon where "the filling in is not good", meaning that the underlying color of the printing substrate (for example, white) is conspicuous even when high-density dots are formed on the printing substrate. Such a phenomenon is more likely to be noticeable in a case where a monochrome image is being formed by K dots.

Moreover, when the ink droplets are discharged from the nozzles, an air flow (wind) is produced in the vicinity. When the ink droplets being discharged from the nozzles have a high discharge density, the air flow caused by other ink droplets having been discharged in the vicinity causes the ink droplets to drift somewhat before landing on the printing substrate. When such a phenomenon occurs in a large number of ink droplets, then this can sometimes produce a "wind ripples" phenomenon where curving streaks of the underlying color appear when high-density dots are formed on the printing substrate. Such a phenomenon, too, is more likely to be noticeable in a case where a monochrome image is being formed by K dots.

The inkjet recording apparatus disclosed in patent document 1 merely replaces the K dots with the composite black dots, irrespective of the density of the dots, and is unable to solve the aforementioned problems that arise in a case where high-density dots are being formed on the printing substrate.

In view of the foregoing, one of the objectives of the present invention is to improve the image quality of a monochrome image.

In order to achieve one of the aforementioned objectives, the present invention includes the aspect of an image formation apparatus configured to form a monochrome image by discharging ink droplets on the basis of recording data from a plurality of nozzles having black nozzles for discharging black ink droplets and color nozzles for discharging color ink droplets that produce composite black, the image formation apparatus comprising a control unit configured to form the monochrome image by discharging the black ink droplets from the black nozzles and discharging the color ink droplets that produce composite black from the color nozzles when the recording density of black ink represented by the recording data is a predetermined density or higher.

The present invention also includes the aspect of an image formation method for forming a monochrome image by discharging ink droplets on the basis of recording data from a plurality of nozzles having black nozzles for discharging black ink droplets and color nozzles for discharging color ink droplets that produce composite black, the method comprising forming the monochrome image by discharging the black ink droplets from the black nozzles and discharging the color ink droplets that produce composite black from the color nozzles when the recording density of black ink represented by the recording data is a predetermined density or higher.

In the aspects above, dots of the color ink droplets that produce the composite black are formed in the monochrome image when the recording density of the black ink represented by the recording data is the predetermined density or higher, and therefore the rate of coverage of the dots is larger, which causes the underlying color of the recording substrate to become inconspicuous and suppresses wind rippling. As such, the aspects make it possible to improve the image quality of the monochrome image.

Moreover, the present invention can be applied to apparatuses such as printing apparatus, including image formation apparatuses, as well as methods such as printing methods comprising image formation methods, image formation programs for causing a computer to implement a function corresponding to the constituent requirements of an image formation apparatus, programs such as printing programs including these image formation programs, computer-readable media on which these programs have been stored, and the like. The aforementioned devices may be constituted of a plurality of distributed portions.

BRIEF DESCRIPTION OF THE DRAWINGS

Referring now to the attached drawings which form a part of this original disclosure:

FIG. 10 is a drawing schematically illustrating an example of a structure of a look-up table;

DETAILED DESCRIPTION OF EMBODIMENTS

Figure 1:
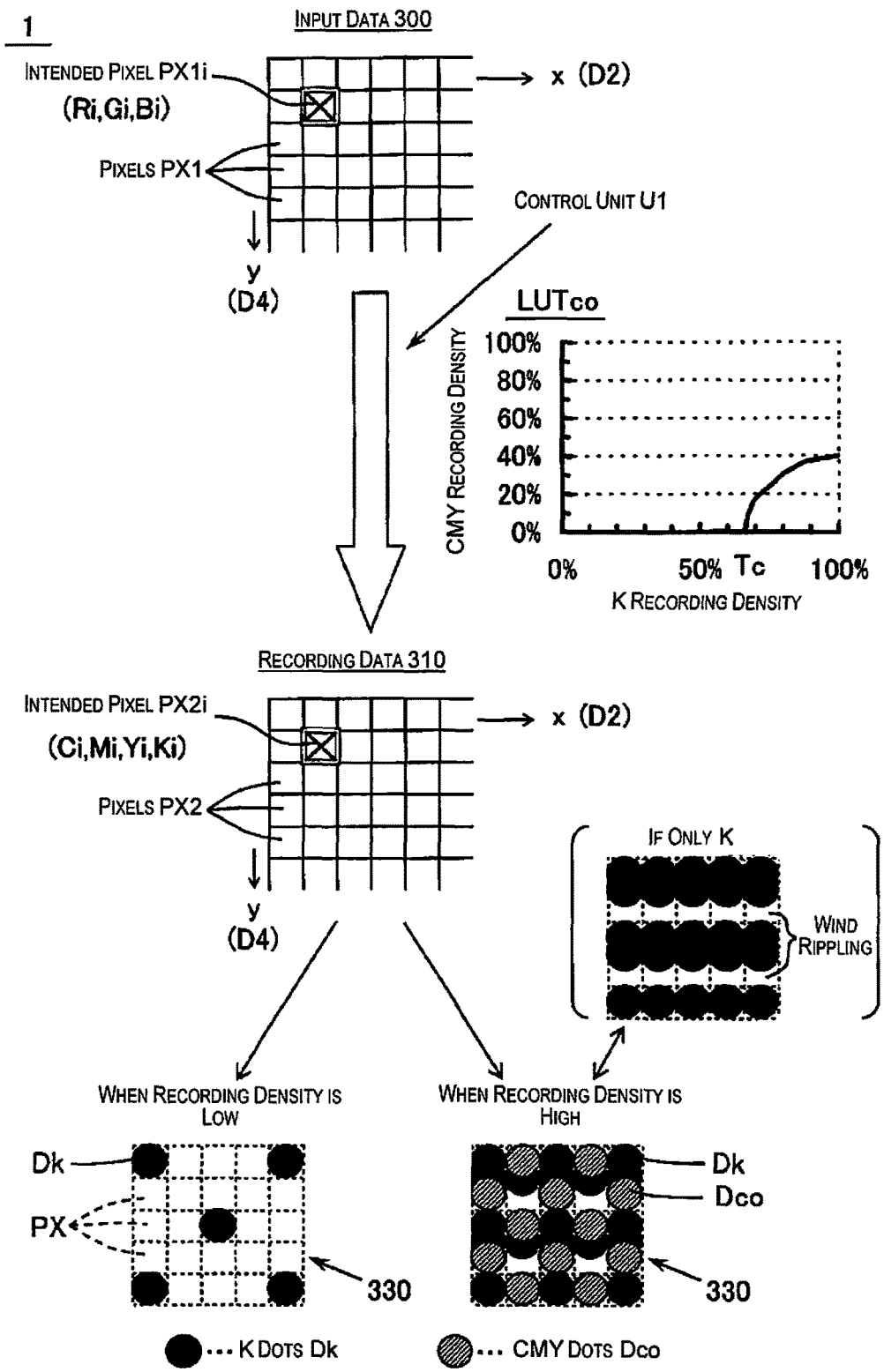
FIG. 1 is a drawing schematically illustrating an example of the manner in which composite black is added when the recording density of K ink is a predetermined density (Tc) or higher.

An embodiment of the present invention shall be described below. It shall be readily understood that the following embodiment is merely illustrative of an example of the present invention, and in no way are all of the features illustrated in the embodiment essential to the solution of the invention.

(1) Overview of the Present Technology

First, an overview of the present technology shall be described with reference to FIGS. 1 to 16.

A plurality of nozzles 64 of the present technology comprise black nozzles 64k for discharging black ink droplets 67k and color nozzles 64co for discharging ink droplets 67co of colors that produce composite black. An image formation apparatus 1 of the present technology is able to discharge the ink droplets 67 on the basis of recording data 310 from the plurality of nozzles 64 and form a monochrome image 330. When the recording density of black ink as represented in the recording data 310 is a predetermined density (Tc) or higher, then a control unit U1 of the present image formation apparatus 1 forms the monochrome image 330 by discharging the black ink droplets 67k from the black nozzles 64k and, in addition thereto, also discharging the ink droplets 67co of the colors that produce composite black from the color nozzles 64co.

When the recording density of the black ink as represented in the recording data 310 is the predetermined density (Tc) or higher, dots Dco of the ink droplets 67co of the colors that produce composite black are formed on the monochrome image 330, and therefore the rate of coverage by dots DT becomes greater, making the underlying color of a recording substrate 400 less likely to be noticeable and suppressing the wind ripples. As such, the present aspect makes it possible to improve the image quality of the monochrome image 330.

Providing a corrugation, providing a fan, or other attempts in order to avoid the wind ripples would constitute a physical design change, and therefore is disadvantageous in that design changes can be difficult and can increase costs. With the present technology, the control described above makes it possible to suppress the wind ripples and therefore constitutes an easy design change and is also advantageous in terms of cost.

Herein, the aforementioned recording density signifies a proportion at which ink droplets 67 (where the amount of ink droplets is variable, then these would be ink droplets in terms of the maximum quantity) are discharged with respect to pixels PX, and signifies the ratio of the number of dots Dt formed with respect to the number of pixels PX within a predetermined region when there is the same recording density within the predetermined region. The recording density being the predetermined density (Tc) or higher includes being larger than a density that is very minutely smaller than the predetermined density (Tc).

The inks of the colors that produce composite black encompass inks such as cyan (C), magenta (M), yellow (Y), light cyan (lc), light magenta (lm), dark yellow (DY), red (R), orange (Or), green (Gr), and violet (V). The colors that produce composite black can be a mixture of colors selected from these colors, and though a mixture of CMY is preferable, the colors may be colors other than a mixture of CMY, such as, for example, a mixture of CM.

The image formation apparatus 1 may be provided with a recording substrate setting input unit U21 for inputting one recording substrate setting out of a plurality of recording substrate settings comprising a first recording substrate setting 521 for forming the monochrome image 330 on a first recording substrate 401 and a second recording substrate setting 522 for forming the monochrome image 330 on a second recording substrate 402 that has ink bleeding more readily than the first recording substrate 401. As illustratively exemplified in FIGS. 12A and 12B, when the second recording substrate setting 522 has been inputted, the control unit U1 may either form the monochrome image 330 by causing the proportion of the color ink droplets 67co coming from the color nozzles 64co added to the black ink droplets 67k coming from the black nozzles 64k to be less than when the first recording substrate setting 521 has been inputted, or do so without adding the color ink droplets 67co.

The first recording substrate 401, which does not readily have ink bleeding, has a smaller rate of coverage by the dots DT from the ink droplets than the second recording substrate 402, which has ink bleeding more readily. In the above aspect, in the case of the first recording substrate setting 521, in which the monochrome image is formed on the first recording substrate 401 that does not readily have ink bleeding, either the proportion of the color ink droplets 67co is greater or the color ink droplets 67co are added, causing the printing to have better filling in and suppressing the wind ripples. In the case of the second recording substrate setting 522, meanwhile, the amount of ink used is reduced. As such, the conspicuousness of the underlying color of the recording substrate 400 is efficiently suppressed, the wind ripples of the monochrome image 330 are efficiently suppressed, and the image quality of the monochrome image 330 is improved.

The present image formation apparatus 1 may be provided with an interval setting input unit U22 for inputting one interval setting out of a plurality of interval settings comprising a first interval setting 531 indicating that the distance from the plurality of nozzles 64 to a conveyance position L1 of the recording substrate 400 is a first distance PG1, and a second interval setting 532 indicating that the distance from the plurality of nozzles 64 to the conveyance position L1 of the recording substrate 400 is a second distance PG2 that is longer than the first distance PG1. As illustratively exemplified in FIGS. 14A and 14B, when the first interval setting 531 has been inputted, the control unit U1 may either form the monochrome image 330 by causing the proportion of the color ink droplets 67*co* coming from the color nozzles 64*co* added to the black ink droplets 67*k* coming from the black nozzles 64*k* to be less than when the second interval setting 532 has been inputted, or do so without adding the color ink droplets 67*co*.

In the case where the setting is the second interval setting 532, in which the distance PG from the plurality of nozzles 64 to the conveyance position L1 of the recording substrate 400 is longer, then the landing of the ink droplets 67 is more readily impacted by the air flow than the case where the setting is the first interval setting 531, in which the distance PG from the plurality of nozzles 64 to the conveyance position L1 of the recording substrate 400 is shorter. In the above aspect, in the case of the second interval setting 532, in which the distance PG is longer, either the proportion of the color ink droplets 67*co* is greater or the color ink droplets 67*co* are added, causing the printing to have better filling in and suppressing the wind ripples. In the case of the first interval setting 531 in which the distance PG is shorter, meanwhile, the amount of ink used is reduced. As such, the conspicuousness of the underlying color of the recording substrate 400 is efficiently suppressed, the wind ripples of the monochrome image 330 are efficiently suppressed, and the image quality of the monochrome image 330 is improved.

The present image formation apparatus 1 may be provided with a scan setting input unit U23 for inputting one scan setting out of a plurality of scan settings comprising a first scan setting 541 for forming all of the dots amounting to one band corresponding to the alignment of the plurality of nozzles 64 by moving the plurality of nozzles 64 one round in a relative manner with respect to the recording substrate 400, and a second scan setting 542 for forming all of the dots amounting to one band corresponding to the alignment of the plurality of nozzles 64 by moving the plurality of nozzles 64 two or more rounds in a relative manner with respect to the recording substrate 400. As illustratively exemplified in FIGS. 15A and 15B, when the second scan setting 542 has been inputted, the control unit U1 may either form the monochrome image 330 by causing the proportion of the color ink droplets 67*co* coming from the color nozzles 64*co* added to the black ink droplets 67*k* coming from the black nozzles 64*k* to be less than when the first scan setting 541 has been inputted, or do so without adding the color ink droplets 67*co*.

In a case where the setting is the first scan setting 541 for forming all of the dots amounting to one band by moving the plurality of nozzles 64 one round in a relative manner with respect to the recording substrate 400, then the wind ripples may sometimes occur on the monochrome image 330 when the landing of the ink droplets is affected by the air flow. In a case where the setting is the second scan setting 542 for forming all of the dots amounting to one band by moving the plurality of nozzles 64 two or more rounds in a relative manner with respect to the recording substrate 400, then even when the landing of the ink droplets is affected by the air flow, the second or later rounds of relative movement of the nozzles causes the portion of underlying color of the recording substrate 400 to be covered with dots, thus suppressing the wind ripples on the monochrome image 330. In the above aspect, in the case of the first scan setting 541, in which all of the dots amounting to one band are formed with one round of relative movement, either the proportion of the color ink droplets 67*co* is greater or the color ink droplets 67*co* are added, causing the printing to have better filling in and suppressing the wind ripples. In the case of the second scan setting 542, meanwhile, the amount of ink used is reduced. As such, the conspicuousness of the underlying color of the recording substrate 400 is efficiently suppressed, the wind ripples of the monochrome image 330 are efficiently suppressed, and the image quality of the monochrome image 330 is improved.

Herein, the act of moving the nozzles 64 in a relative manner with respect to the recording substrate 400 encompasses: when the recording substrate 400 does not move and the nozzles 64 do move in a relative movement direction, as with a serial printer; when the nozzles 64 do not move and the recording substrate 400 does move in a relative movement direction, as with a line printer; and when both the recording substrate 400 and the nozzles 64 move in a relative movement direction.

The present image formation apparatus 1 may be provided with a resolution setting input unit U24 for inputting one resolution setting out of a plurality of resolution settings comprising a first resolution setting 551 for forming the monochrome image 330 at a first resolution in a relative movement direction (main scanning direction D2) of the plurality of nozzles 64 with respect to the recording substrate 400, and a second resolution setting 552 for forming the monochrome image 330 at a second resolution higher than the first resolution in the relative movement direction (D2). As illustratively exemplified in FIGS. 16A and 16B, when the first resolution setting 551 has been inputted, the control unit U1 may either form the monochrome image 330 by causing the proportion of the color ink droplets 67*co* coming from the color nozzles 64*co* added to the black ink droplets 67*k* coming from the black nozzles 64*k* to be less than when the second resolution setting 552 has been inputted, or do so without adding the color ink droplets 67*co*.

In a case where the setting is the second resolution setting 552, in which the resolution in the relative movement direction (D2) of the plurality of nozzles 64 with respect to the recording substrate 400 is higher, then the landing of the ink droplets is more readily affected by the air flow because the frequency of discharge (the density of discharge in the relative movement direction) of the ink droplets is higher, as compared to a case where the setting is the first resolution setting 551, in which the resolution in the relative movement direction (D2) is lower. In the above aspect, in the case of the second resolution setting 552, in which the resolution is higher, either the proportion of the color ink droplets 67*co* is greater or the color ink droplets 67*co* are added, causing the printing to have better filling in and suppressing the wind ripples. Meanwhile, in the case of the first resolution setting 551, in which the resolution is lower, the amount of ink used is reduced. As such, the conspicuousness of the underlying color of the recording substrate 400 is efficiently suppressed, the wind ripples of the monochrome image 330 are efficiently suppressed, and the image quality of the monochrome image 330 is improved.

Figure 11:
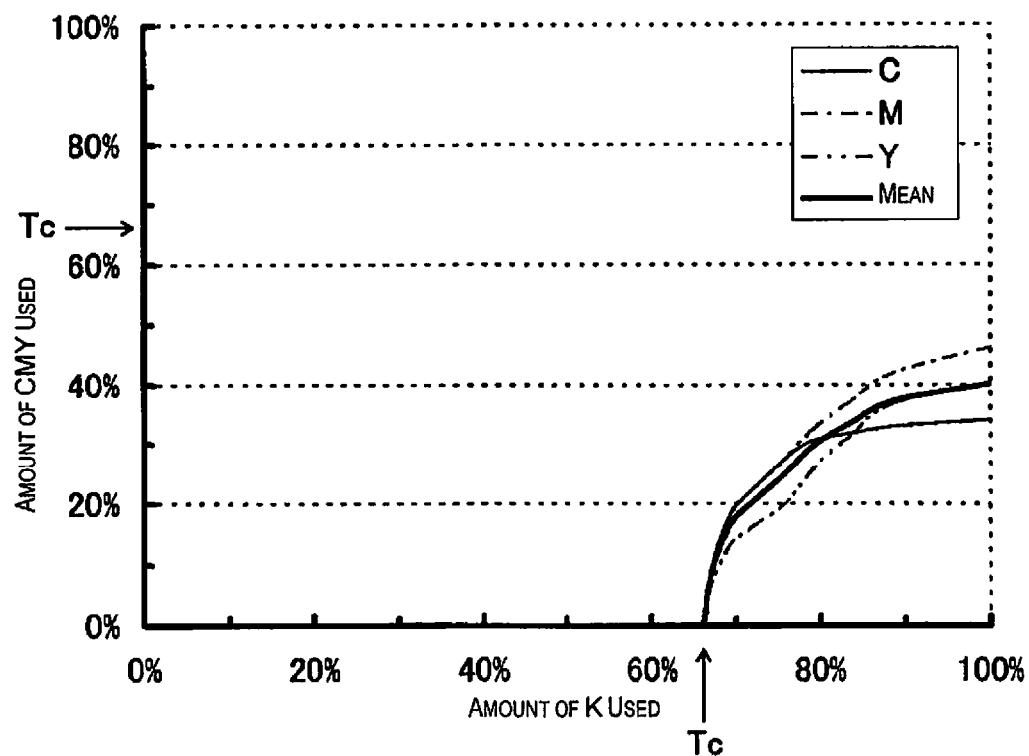
FIG. 11 is a drawing schematically illustrating an example of amounts of CMY used with respect to an amount of K used.

The control unit U1 may: consult a look-up table LUTco that prescribes relationships of correspondence between an used amount of input color and a recording density of ink discharged from the plurality of nozzles 64, the look-up table LUTco prescribing a relationship of correspondence where composite black is added when the recording density of the black ink is the predetermined density (Tc) or higher; convert input data 300 represented with the input colors into the aforementioned recording data 310; and form the monochrome image 330 by discharging the ink droplets 67 from the plurality of nozzles 64 on the basis of this recording data 310 (illustratively exemplified in FIG. 11). This aspect can provide a suitable example that improves the image quality of the monochrome image 330, because the composite black is added when the recording density of the black ink is the predetermined density (Tc) or higher when the input data 300 represented with the input colors is converted to the recording data 310.

The look-up table shall also be denoted by "LUT" below.

Figure 2:
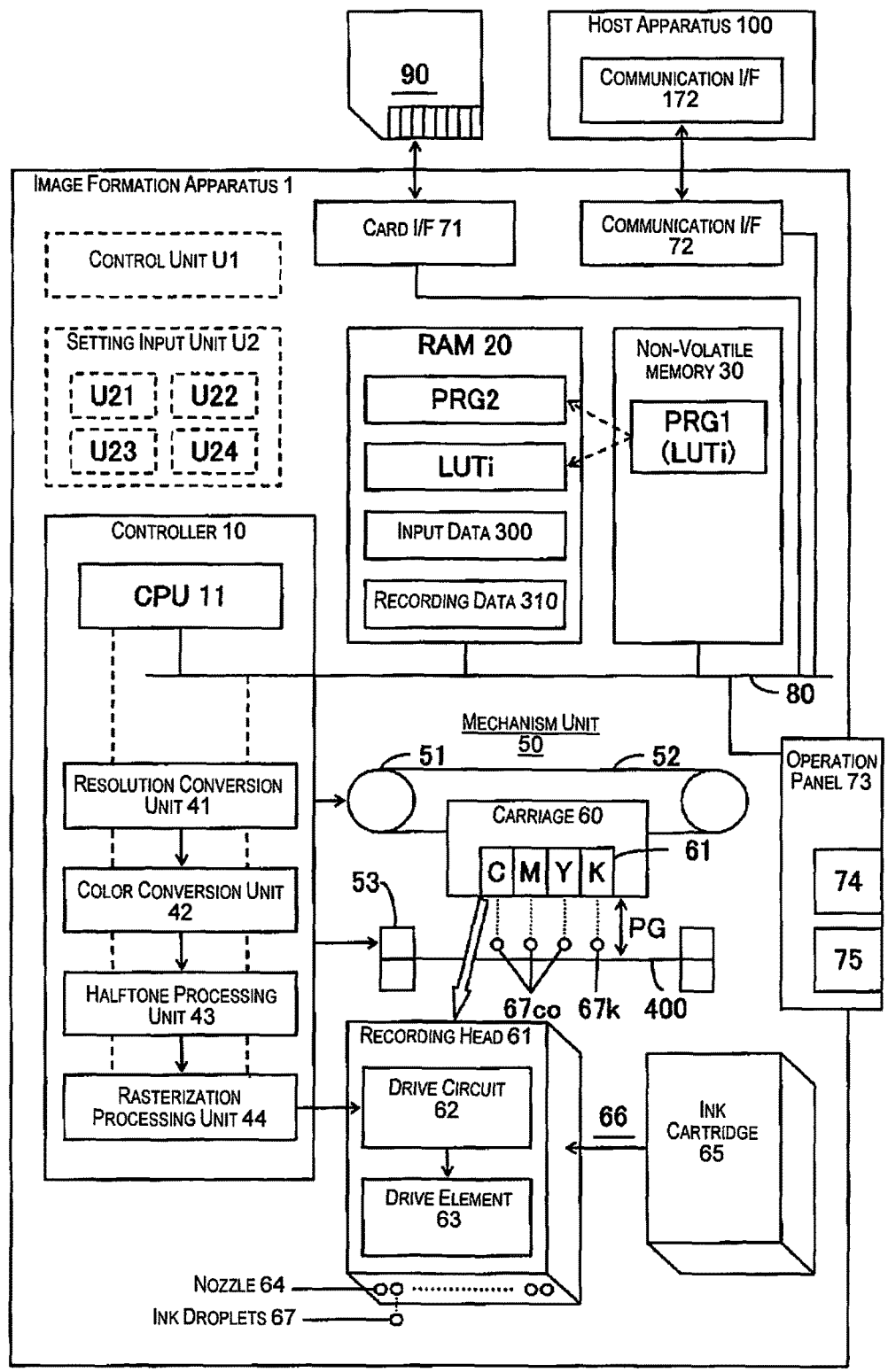
FIG. 2 is a drawing schematically illustrating an example of a configuration of an image formation apparatus 1.
Figure 3:
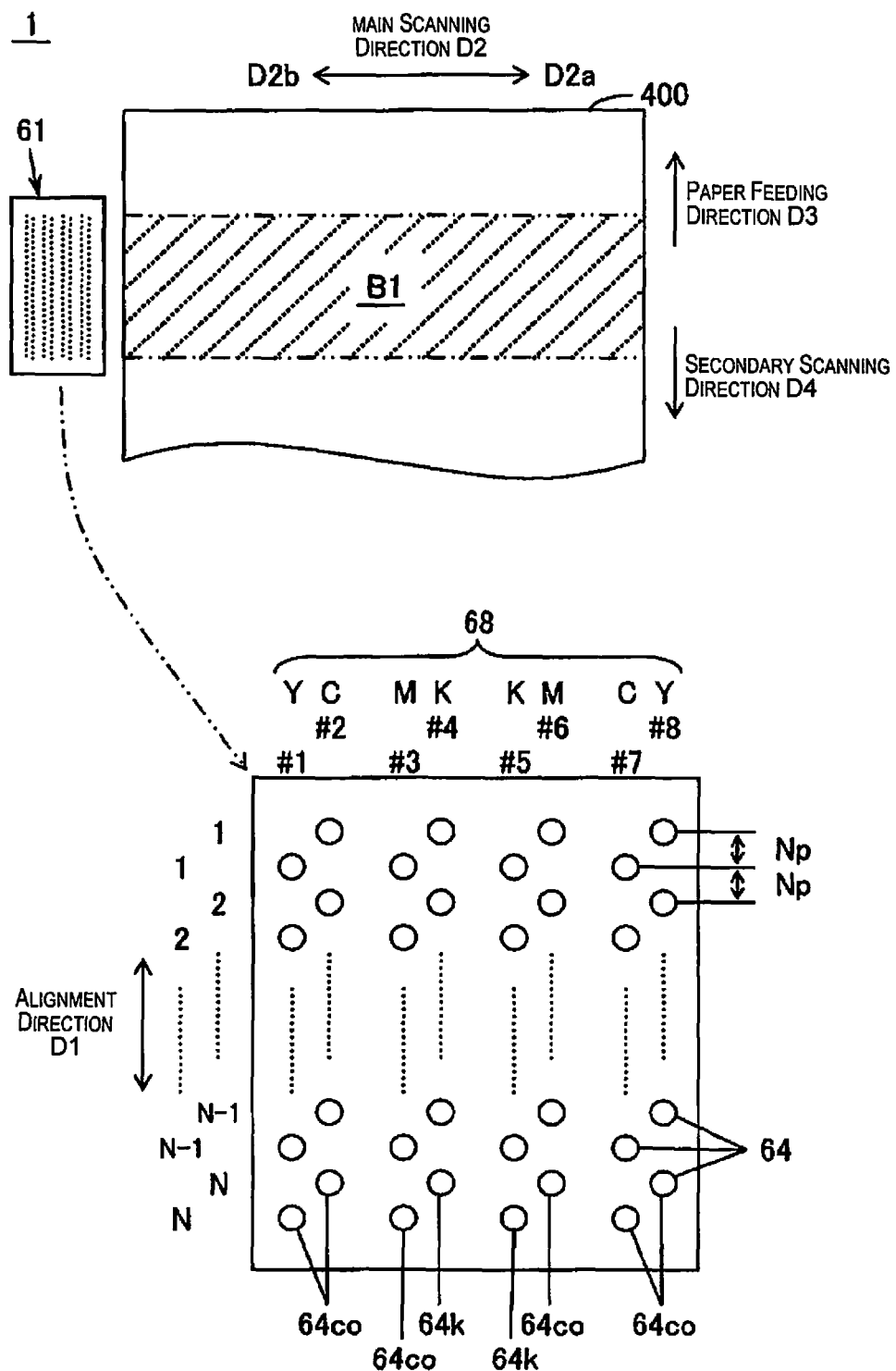
FIG. 3 is a drawing schematically illustrating an example of a configuration of a recording head 61.

(2) Specific Examples of an Image Formation Apparatus and an Image Formation Method FIG. 1 schematically illustrates a specific example where composite black is added when the recording density of K ink is the predetermined density or higher. FIG. 2 schematically illustrates an example of a configuration of the image formation apparatus 1. FIG. 3 schematically illustrates an example of essential parts of a serial printer, as the image formation apparatus 1. In these drawings, the reference sign D1 indicates an alignment direction of the nozzles 64, the reference sign D2 indicates the main scanning direction of a recording head 61, the reference sign D2a indicates a forward direction of the main scanning direction D2, the reference sign D2b indicates a return direction of the main scanning direction D2, the reference sign D3 indicates a paper feeding direction of the recording substrate 400, meaning the printing substrate, and the reference sign D4 indicates a secondary scanning direction opposite to the paper feeding direction D3. The main scanning direction D2 and the remaining directions D1, D3, D4 need only intersect with one another, and the present invention encompasses not only instances where the main scanning direction D2 and the remaining directions D1, D3, D4 are orthogonal to one another but also instances where these direction are not orthogonal to one another. Being orthogonal also encompasses deviation from exact orthogonality due to error. For the purpose of illustration that is easier to understand, the rates of magnification of each of the directions may be different in some instances, and the drawings may not be consistent to one another in some instances. The dots illustrated in FIGS. 1, 7-9, 12, and 14-16 are schematically illustrated entirely for the purpose of description; the sizes, shapes, and the like of the dots that are actually formed are not necessarily as illustrated in these drawings. The recording head 61 illustrated in FIGS. 2, 3, and 7-9 is also schematically illustrated entirely for the purpose of description, and the actual size, shape, and the like are not necessarily as illustrated in these drawings.

The "printing substrate" refers to a material that holds the printed image. The shape is generally that of a rectangle, but does include a circle (for example, an optical disk such as a CD-ROM or DVD), a triangle, a quadrangle, a polygon, or the like, and encompasses at least all of the varieties and processed products of paper and board set forth in the Japanese Industrial Standard "JIS P0001:1998 Paper, board, and pulp—Vocabulary". Also included as printing substrates are resin sheets, metal plates, three-dimensional objects.

The image formation apparatus 1 illustrated in FIG. 1 first consults one of the look-up tables LUTi such as are illustrated in FIG. 10, and thereby converts the input data 300 represented with the input colors into the recording data 310, which is representative of the recording density of ink 66 that is discharged (ejected) from the plurality of nozzles 64. The LUTi are also called color conversion tables. FIG. 1 illustrates a combination of red (R), green (G), and blue (B) as an example of input colors, and illustrates the combination of cyan (C), magenta (M), yellow (Y), and black (K) as an example of the colors of ink. In this example, the mixture CMY is composite black. The input data 300 is data that renders an input image with multiple gradations, where 256 gradations are used to denote a respective RGB density for pixels PX1 that are neatly arranged side by side in an x-direction (main scanning direction D2) and in a y-direction (secondary scanning direction D4). The recording data 310 is data that renders an output image with multiple gradations where 256 gradations are used to denote a respective CMYK density for pixels PX2 that are neatly arranged side by side in the x-direction (main scanning direction D2) and the y-direction (secondary scanning direction D4).

When the monochrome image 330 is formed on the recording substrate 400 by using only the K ink, should the density of discharge of the K ink droplets 67k be high, then the wind ripple phenomenon may occur, in which the air flow caused by other ink droplets 67k having been discharged in the vicinity causes the ink droplets 67k to drift somewhat before landing on the recording substrate 400. In the brackets in FIG. 1 is a schematic illustration of the manner in which the underlying color (for example, white) appears on the recording substrate when only the K ink has been used. FIG. 1 does not depict the wind ripples as curving, but the wind ripples that actually occur take the shape of a curve or the like. The present image formation apparatus 1 generates the recording data 310 so that the K ink droplets 67k are discharged from the recording head 61 and, in addition thereto, the CMY ink droplets 67co that produce composite black are also discharged when the recording density of the K ink as represented in the recording data 310 is high.

The image formation apparatus 1 illustrated in FIG. 2 is provided with a controller 10, a random access memory (RAM) 20, a non-volatile memory 30, a mechanism unit 50, interfaces (I/F) 71 and 72, an operation panel 73, and the like. The controller 10, the RAM 20, the non-volatile memory 30, the I/F 71 and 72, and the operation panel 73 are connected to a bus 80 and are capable of inputting and outputting information with respect to one another.

The controller 10 is provided with a central processing unit (CPU) 11, a resolution conversion unit 41, a color conversion unit 42, a halftone processing unit 43, a rasterization processing unit 44, and the like. The controller 10 can be constituted of a system on a chip (SoC) or the like.

The CPU 11 is an apparatus for centrally carrying out the information processing and control in the image formation apparatus 1. The resolution conversion unit 41 converts resolution of an input image (the input data 300) from a host apparatus 100, a memory card 90, or the like into a set resolution. The color conversion unit 42 is for converting pixel values (understood to be Ri, Gi, Bi) of the input data into pixel values (understood to be Ci, Mi, Yi, Ki) of the recording data 310, for every pixel. The "i" here is information for identifying the pixels PX. The pixel values Ri, Gi, Bi, Ci, Mi, Yi, Ki are rendered with gradation values with multiple gradations, for example, integer values of 256 gradations 0 to 255. The halftone processing unit 43 carries out a predetermined halftone process, e.g., a dither method, an error diffusion method, or a density pattern method, on the gradation values of each of the pixels constituting the recording data 310, and reduces the number of gradations of the gradation values to generate multivalued data. The multivalued data is data representative of the circumstances of formation of the dots, and may be binary data representative of whether or not a dot is formed, or may be multivalued data of three or more gradations able to address dots of different sizes, such as large dots, medium dots, and small dots. Binary data could be, for example, data where 1 corresponds to dot formation and 0 corresponds to no dot. One possible example of quaternary data is data where 3 corresponds to large dot formation, 2 corresponds to medium dot formation, 1 corresponds to small dot formation, and 0 corresponds to no dot. The rasterization processing unit 44 rearranges the multivalued data into the order in which the dots are formed at the mechanism unit 50 and generates raster data (image data in pass units); a drive signal corresponding to a voltage signal to be applied to a drive element 63 of the recording head 61 is generated from the raster data and outputted to a drive circuit 62. For example, when the multivalued data is "large dot formation", then a drive signal for causing a large-dot ink droplet (liquid droplet) 67 to be discharged is outputted; when the multivalued data is "medium dot formation", then a drive signal for causing a medium-dot ink droplet 67 to be discharged is outputted; and when the multivalued data is "small dot formation", then a drive signal for causing a small-dot ink droplet 67 to be discharged is outputted. Each of these units 41 to 44 may be constituted of an application-specific integrated circuit (ASIC); the data that is to be processed may be read in from the RAM 20 directly, or already-processed data may be written directly onto the RAM 20.

The controller 10 also controls a carriage motor 51, a paper feeding mechanism 53, and the like within the mechanism unit 50.

The mechanism unit 50, which is controlled by the controller 10, is provided with the carriage motor 51, a timing belt 52, the paper feeding mechanism 53, a carriage 60, the recording head 61, and the like, and constitutes a control unit U1 along with the controller 10. The carriage motor 51 moves the carriage 60 reciprocally in the main scanning direction D2 via a plurality of gears (not shown) and the belt 52. The paper feeding mechanism 53 conveys the recording substrate 400 in the paper feeding direction D3, which is orthogonal to the main scanning direction D2. Mounted onto the carriage 60 is the recording head 61, which discharges the, for example, CMYK ink droplets 67. The recording head 61 is provided with the drive circuit 62, the drive element 63, and the like. The drive circuit 62 applies a voltage signal to the drive element 63 in accordance with the drive signal that is inputted from the controller 10. For the drive element 63, it would be possible to use a piezoelectric element for applying pressure to the ink 66 inside a pressure chamber communicating with the nozzles 64, a drive element for using heat to cause bubbles to be generated inside a pressure chamber and causing the ink droplets 67 to be discharged from the nozzles 64, or the like. The ink 66 is supplied to the pressure chamber of the recording head 61 from an ink cartridge 65. Respective combinations of an ink cartridge 65 and a recording head 61 are provided, for example, for each of CMYK. The ink 66 in the pressure chamber is discharged in the form of the ink droplets 67 toward the recording substrate 400 from the nozzles 64, by the drive element 63. This causes dots of the ink droplets 67 to be formed on the recording substrate 400 and causes an output image (comprising the monochrome image 330) corresponding to the recording data 310 to be printed. When the multivalued data is quaternary data, the output image is printed by the formation of dots corresponding to the dot sizes represented in the multivalued data.

The RAM 20 is a large-capacity, volatile semiconductor memory; a program PRG2, the LUTi, the input data 300, the recording data 310, and the like are stored. The program PRG2 comprises an image formation program for causing the image formation apparatus 1 to implement such functions as a control function for causing the image formation apparatus 1 to function as the control unit U1, and a setting input function for causing the image formation apparatus 1 to function as a setting input unit U2. Included in the setting input unit U2 are the recording substrate setting input unit U21, the interval setting input unit U22, the scan setting input unit U23, and the resolution setting input unit U24.

The non-volatile memory 30 stores program data PRG1 that is deployed for the LUTi and the program PRG2, and the like. A read-only memory (ROM), magnetic recording medium such as a hard disk, or the like is used for the non-volatile memory 30. Deploying the program data PRG1 signifies writing onto the RAM 20 as a program that is interpretable in the CPU 11.

The card I/F 71 is a circuit for writing data onto the memory card 90, or reading data out from the memory card 90. The memory card 90 is a non-volatile semiconductor memory with which data can be written and erased; inter alia, images captured by an imaging apparatus such as a digital camera are stored. The images are represented with, for example, the pixel values Ri, Gi, Bi of the RGB color space, and each of the RGB pixel values is represented with, for example, an 8-bit gradation value of 0 to 255.

The communication IN 72 is connected to a communication I/F 172 of the host apparatus 100, and engages in the inputting and outputting of information with respect to the host apparatus 100. A universal serial bus (USB) or the like can be used for the communication I/Fs 72, 172. The host apparatus 100 includes a computer such as a personal computer, a digital camera, a digital video camera, a mobile telephone such as a smartphone, and the like.

The operation panel 73 has an output unit 74, an input unit 75, and the like; a user is able to input a variety of instructions to the image formation apparatus 1. The output unit 74 is constituted of, for example, a liquid crystal panel (display unit) for displaying information corresponding to a variety of instructions or information indicative of the status of the image formation apparatus 1. The output unit 74 may provide audio output of this information. The input unit 75 is constituted of, for example, operation keys (an operation input unit) such as a cursor key and an enter key. The input unit 75 may be a touch panel for accepting operations on a display screen, or the like. The operation panel 73 constitutes the setting input unit U2, along with the controller 10 and the I/Fs 71, 72. Information representative of a setting that has been inputted is stored in, for example, the RAM 20.

The image formation apparatus 1 illustrated in FIG. 3 causes the recording head 61 to move reciprocally in the main scanning direction D2, conveys the recording substrate 400 intermittently in the paper feeding direction D3, and prints an output image such as the monochrome image 330. A band B1 illustrated on the recording substrate 400 illustrates a region where dots can be formed with main scanning of the recording head 61 in a state where the recording substrate 400 is not being conveyed. The lower part of FIG. 3 illustratively exemplifies a nozzle column 68 formed on a nozzle surface of the recording head 61. The recording head 61 has, arranged in the main scanning direction D2, nozzle columns #1 to #8 in which a number N of nozzles 64 are arranged side by side in the alignment direction D1, which matches the secondary scanning direction D4. The nozzle columns #1 to #8 are a Y nozzle column, a C nozzle column, an M nozzle column, a K nozzle column, a K nozzle column, an M nozzle column, a C nozzle column, and a Y nozzle column, in the stated order. As such, the colors of ink of the nozzle columns #1 to #8 in the recording head 61 are arranged so as to be symmetrical in the main scanning direction D2 when viewed in nozzle column units. It shall be readily understood that the order of colors of the inks can be variously ordered, and the combinations of colors of the inks can also be variously combined. The recording head may also be one where there is only one column for each of the CMYK nozzle columns, and the colors of the inks of the nozzle columns are arranged asymmetrically in the main scanning direction.

The nozzle columns #1 to #8 illustrated in FIG. 3 are divided into four sets—a set of the relatively close #1 and #2, a set of the relatively close #3 and #4, a set of the relatively close #5 and #6, and a set of the relatively close #7 and #8. Each of the nozzles 64 of the nozzle columns of each of the sets take a staggered arrangement of being displaced alternately along the alignment direction D1. As a result, each of the nozzles 64 of the set of Y nozzle columns #1 and #8, the set of C nozzle columns #2 and #7, the M nozzle columns #3 and #6, and the K nozzle columns #4 and #5 is also arranged so as to be alternately displaced along the alignment direction D1. When viewed in nozzle units, each of the nozzles 64 will be arranged with point symmetry with respect to the center of the nozzle surface of the recording head 61. Where the pitch of each of the nozzles of the nozzle columns #1, #3, #5, and #7 and each of the nozzles of the nozzle columns #2, #4, #6, and #8 in the alignment direction D1 is Np, the pitch of the nozzles 64 of each of the nozzle columns #1 to #8 is 2×Np. For example, when the nozzle pitch of each of the nozzle columns #1 to #8 is 300 dpi equivalence, then the nozzle pitch Np for every color of CMYK will be 600 dpi equivalence. It shall be readily understood that beyond 600 dpi, the nozzle pitch Np may also be 720 dpi or the like.

The alignment direction D1 of the nozzles in the nozzle columns, in which the nozzles are arranged in a staggered manner, signifies the direction of alignment of the nozzles of every column in the staggered arrangement.

Included in the plurality of nozzles 64 illustrated in FIG. 3 are the K nozzles 64k arrayed in the K nozzle columns #4 and #5, and the color nozzles 64co arrayed in the CMY nozzle columns #1 to #3 and #6 to #8. From the K nozzles 64k, the K ink droplets 67k are discharged and K dots Dk are formed on the recording substrate 400. From the color nozzles 64co, ink droplets 67co of any of CMY that produce composite black are discharged and dots Dco of any of CMY are formed on the recording substrate 400.

(3) Description of the Printing Process

Figure 4:
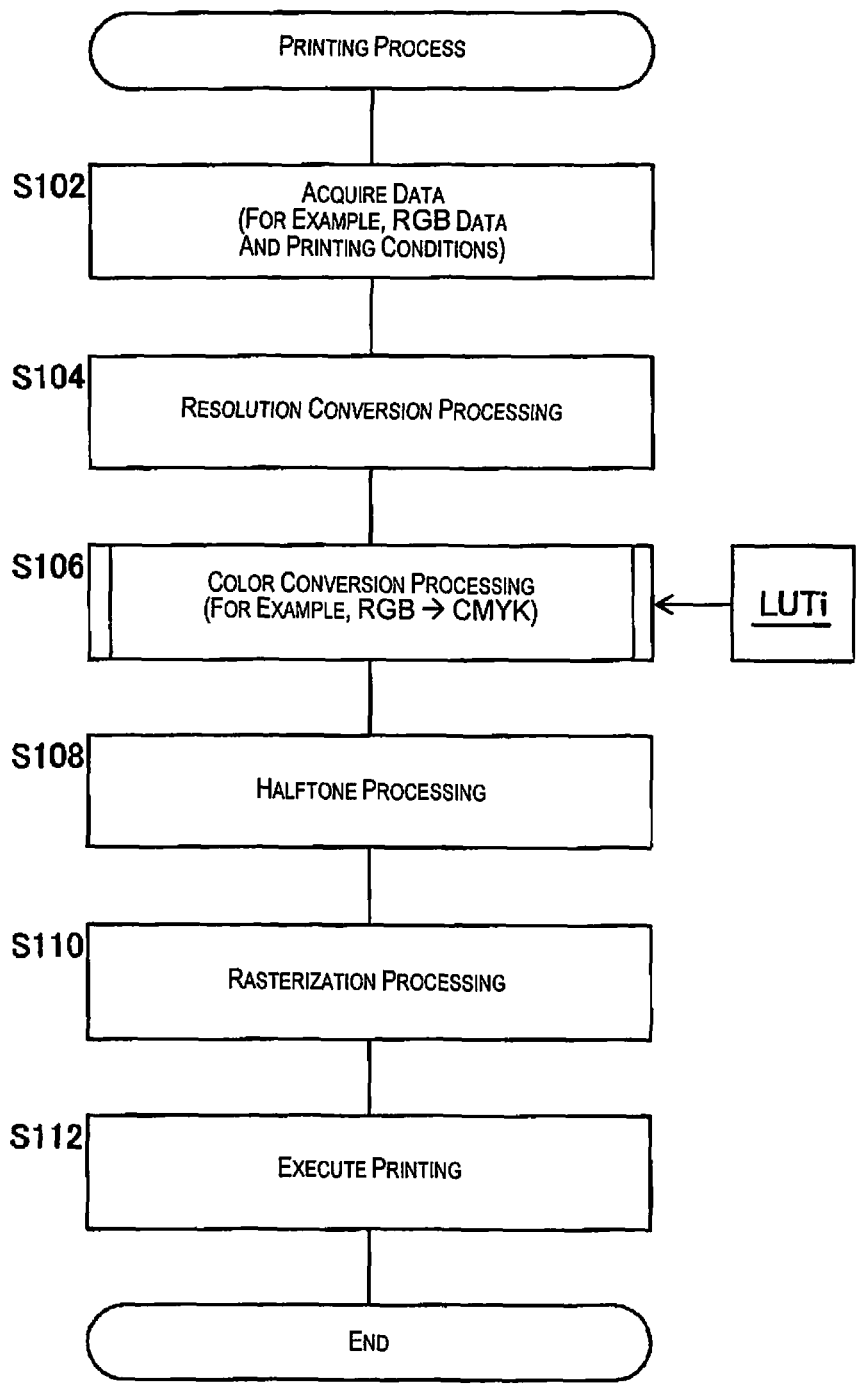
FIG. 4 is a flow chart illustrating an example of a printing process.
Figure 5:
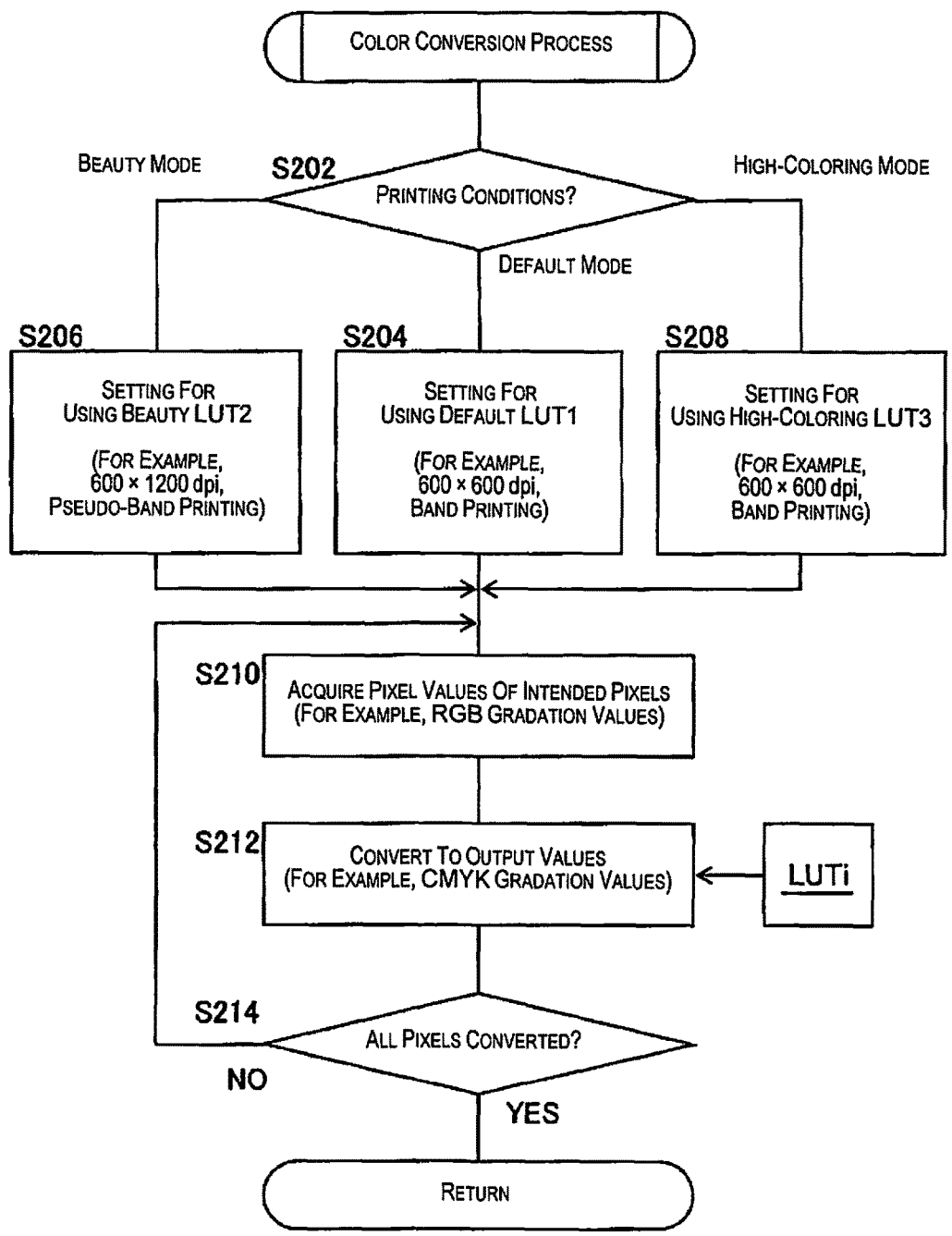
FIG. 5 is a flow chart illustrating an example of a color conversion process.

FIG. 4 is a flow chart illustrating an example of a printing process that is carried out in the image formation apparatus 1. FIG. 5 is a flow chart illustrating an example of a color conversion process of a step S106 in FIG. 4. The language "step" is omitted hereinbelow. Herein, S102 corresponds to the setting input unit U2, a setting input step, and a setting input function. S106 to S112 corresponds to the control unit U1, a control step, and a control function. The printing process may be implemented by an electrical circuit, or may be implemented by a program.

(3-1) Printing Process:

When, for example, an image (including printing conditions) and a printing instruction are received from the host apparatus, then the image formation apparatus 1 stores the received image in the RAM 20 and starts the printing process. When an image that has been recorded onto the memory card 90 is selected by an operation with the operation panel 73, then the image formation apparatus 1 stores the selected image in the RAM 20 and starts the printing process.

When the printing process is started, the controller 10 carries out pre-processing such as deploying the program data PRG1 in the non-volatile memory 30 to the RAM 20 as needed, and then acquires data relating to the image, which is stored in the RAM 20 (S102).

Figure 6A:
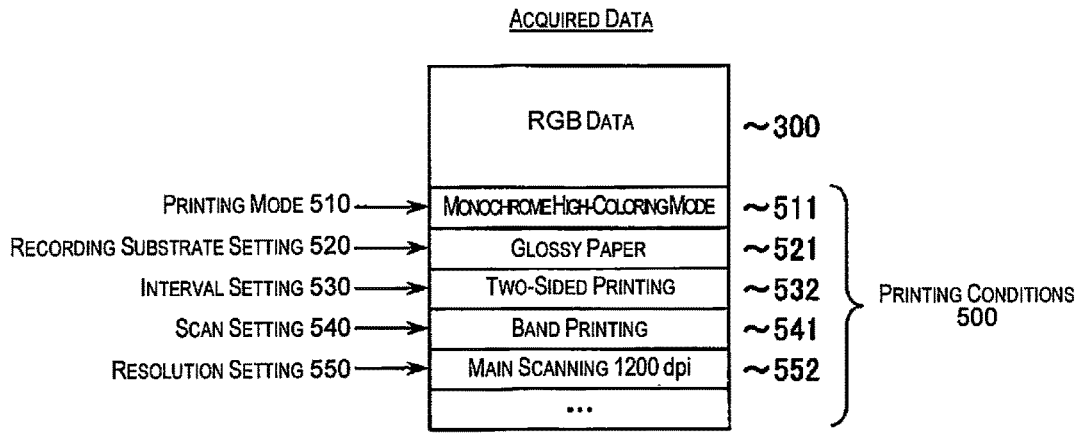
FIGS. 6A and 6B are drawings schematically illustrating an example of a structure of acquired data.
Figure 6B:
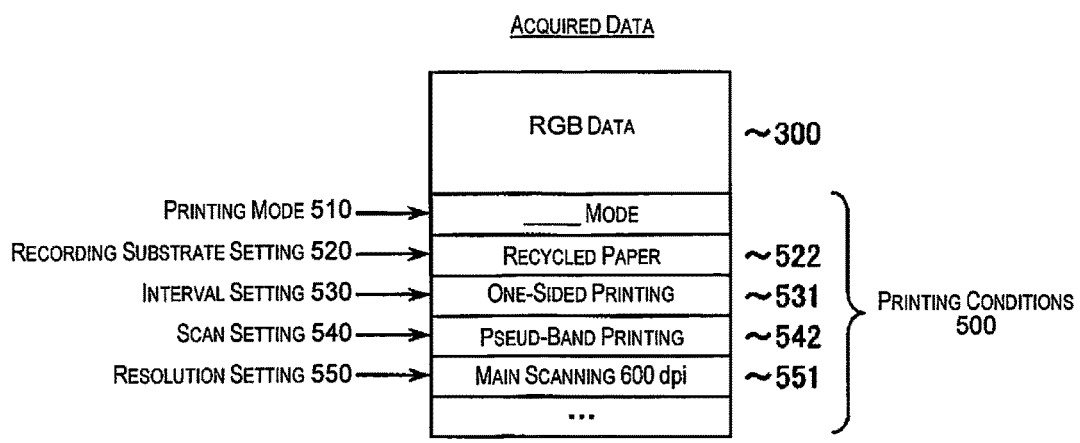

FIGS. 6A and 6B schematically illustrate an example of the structure of the data that is acquired in S102. Included in this acquired data are, for example: RGB data (the input data 300 before resolution conversion), which has the pixel values (Ri, Gi, Bi) of 256 gradations for each of the pixels PX1; and a variety of printing conditions 500 relating to the image formation. Included in the printing conditions 500 are: a printing mode 510, such as a monochrome high-coloring mode 511; a recording substrate setting 520, such as glossy paper (the first recording substrate setting 521) or recycled paper (the second recording substrate setting 522); an interval setting 530, such as one-sided printing (the first interval setting 531) or two-sided printing (the second interval setting 532); a scan setting 540, such as band printing (the first scan setting 541) or pseudo-band printing (the second scan setting 542); a resolution setting 550, such as main scanning 600 dpi (the first resolution setting 551) or main scanning 1200 dpi (the second resolution setting 552); and the like. The recording substrate setting 520, the interval setting 530, and the resolution setting 550 also include determinations made depending on the printing mode 510. Each of the printing conditions shall be described in greater detail below.

In the host apparatus 100, where a driver for the image formation apparatus 1 has been installed, it would be possible to carry out the setting operation for the printing conditions 500. For example, the host apparatus 100 receives a selection operation for the printing mode 610 with respect to an image intended to be printed, next receives a selection operation as to whether the intended image should be printed in monochrome or should be printed in color, and carries out a process where the printing conditions 500 are determined so as to form the monochrome image 330 in a case where monochrome printing has been selected, but when the intended image is monochromatic, then the printing conditions 500 are determined so as to form the monochrome image 330 even when color printing has been selected. The printing conditions 500 thus determined are transmitted to the image formation apparatus 1 along with the RGB data.

In S104 in FIG. 4, a predetermined resolution conversion process for matching the RGB data to the scan setting 540 and the resolution setting 550 is carried out at the resolution conversion unit 41. Herein, the resolution of the RGB data is understood to be X dpi (main scanning direction)×Y dpi (secondary scanning direction). In a case where the scan setting 540 is the band printing illustrated in FIG. 7, the pixel pitch Xp in the main scanning direction D2 is 600 dpi equivalence, and the pixel pitch Yp in the secondary scanning direction D4 is 600 dpi equivalence, then the number of pixels in the main scanning direction D2 would be 600/X-fold and the number of pixels in the secondary scanning direction D4 would be 600/Y-fold. When the scan setting 540 is the pseudo-band printing illustrated in FIG. 8 and the pixel pitch Yp in the secondary scanning direction D4 is 1200 dpi equivalence, then the number of pixels in the secondary scanning direction D4 would be 1200/Y-fold. When the pixel pitch Xp in the main scanning direction D2 is 1200 dpi equivalence, then the number of pixels in the main scanning direction D2 would be 1200/X-fold.

In S106 in FIG. 4, a predetermined color conversion process for converting the resolution-converted input data 300 into, for example, CMYK data (the recording data 310) that has the pixel values (Ci, Mi, Yi, Ki) of 256 gradations for each of the pixels PX2 is carried out at the color conversion unit 42. In S108, a predetermined halftone process is carried out on the recording data 310 at the halftone processing unit 43, and the number of gradations is reduced; multivalued data representative of the circumstances of dot formation for every pixel is generated, for example, for each of CMYK. This multivalued data may be binary data representative of whether or not a dot is formed, or may be quaternary data with which large dots, medium dots, and small dots can each be formed, or may be some other kind of multivalued data. In S110, a predetermined rasterization process is carried out on the multivalued data at the rasterization processing unit 44, and raster data, for example, for each of CMYK is generated with rearrangement in the order in which the dots are formed at the mechanism unit 50. In S112, drive signals corresponding to the raster data are generated and outputted to the drive circuit 62 of the recording head 61; the drive element 63 is driven in accordance with the raster data and the ink droplets 67 are discharged from the nozzles 64 of the recording head 61, to execute the printing. This causes a multivalued (for example, quaternary) printed image (comprising the monochrome image 330) to be rendered with the circumstances of dot formation on the recording substrate 400, thus concluding the printing process.

(3-2) Color Conversion Process:

Next, the color conversion process shall be described with reference to FIG. 5 and the like. When the color conversion process is started, the controller 10 branches the process in accordance with the printing conditions 500 that have been acquired in S102 in FIG. 4 (S202). The example in FIG. 5 assumes that the monochrome image 330 is being formed, and illustrates setting so as to use a default LUT1 illustrated in FIG. 10 when the printing mode 510 is a "default mode" (S204), setting so as to use a beauty LUT2 when the printing mode 510 is a "beauty mode" (S206), and setting so as to use a high-coloring LUT3 illustrated in FIG. 10 when the printing mode 510 is a "high-coloring mode" (S208). It shall be readily understood that the printing modes 510 may encompass a monochrome mode other than the aforementioned monochrome modes, and may encompass a color mode for forming a color image.

The "default mode" is a printing mode for carrying out the band printing at a resolution of 600 dpi (main scanning direction)×600 dpi (secondary scanning direction), on the basis of the recording data 310, which has been generated by consulting the default LUT1. The "beauty mode" is a printing mode for carrying out the pseudo-band printing at a resolution of 600 dpi (main scanning direction)×1200 dpi (secondary scanning direction) on the basis of the recording data 310, which has been generated on the basis of the beauty LUT2. The "high-coloring mode" is a printing mode for carrying out the band printing at a resolution of 600 dpi (main scanning direction)×600 dpi (secondary scanning direction) on the basis of the recording data 310, which has been generated on the basis of the high-coloring LUT3.

Figure 7:
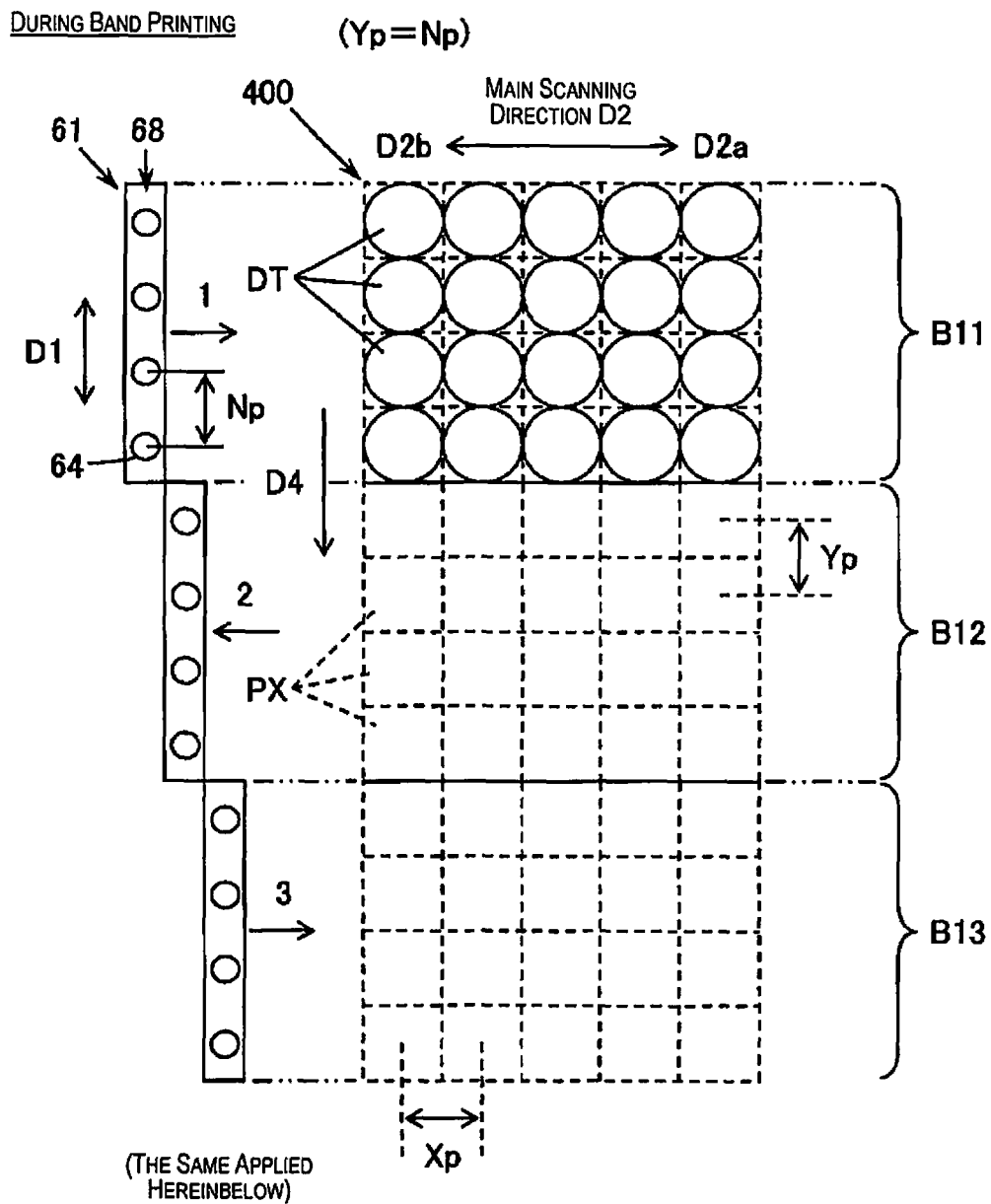
FIG. 7 is a drawing schematically illustrating an example of band printing.

FIG. 7 schematically illustrates an example of the band printing (the first scan setting 541). For the purpose of description that is easy to understand, the recording head 61 is understood to be one where there exists only one nozzle column 68 in which N=4 nozzles 64 are arranged side by side in the alignment direction D1. The band printing is a printing format in which all of the dots amounting to one band, corresponding to the alignment of the plurality of nozzles 64, are formed by moving the recording head 61 one round in the main scanning direction D2 in a relative manner with respect to the recording substrate 400. In the drawing, the numbers assigned to the right of the recording head 61 are indicative of the ordinal number of the round of main scanning of the recording head 61. Where the nozzle pitch is Np in FIG. 7, the example in FIG. 7 assumes bidirectional printing (Bi-d printing) and illustrates forming all of the dots DT that need to be formed with respect to all of the pixels PX of a band B11 in a first round of main scanning that is in the forward direction D2a, feeding the recording substrate 400 by a distance commensurate with N-times the nozzle pitch Np, thereafter forming all of the dots DT that need to be formed with respect to all of the pixels PX of a band B12 in a second round of main scanning that is the return direction D2b, feeding the recording substrate 400 by a distance commensurate with N×Np, and thereafter forming all of the dots that need to be formed with respect to all of the pixels PX of a band B13 in a third round of main scanning that is the forward direction D2a, and so on. In a case where unidirectional printing (Uni-d printing) is being carried out, it would suffice for the dot formation of both odd-numbered rounds and even-numbered rounds to be carried out solely in the main scanning of the forward direction D2a. The pixel pitch Yp in the secondary scanning direction D4 during the band printing will be the nozzle pitch Np. S204 and S208 in FIG. 5 illustrate when the pixel pitch Yp is 600 dpi equivalence.

Figure 8:
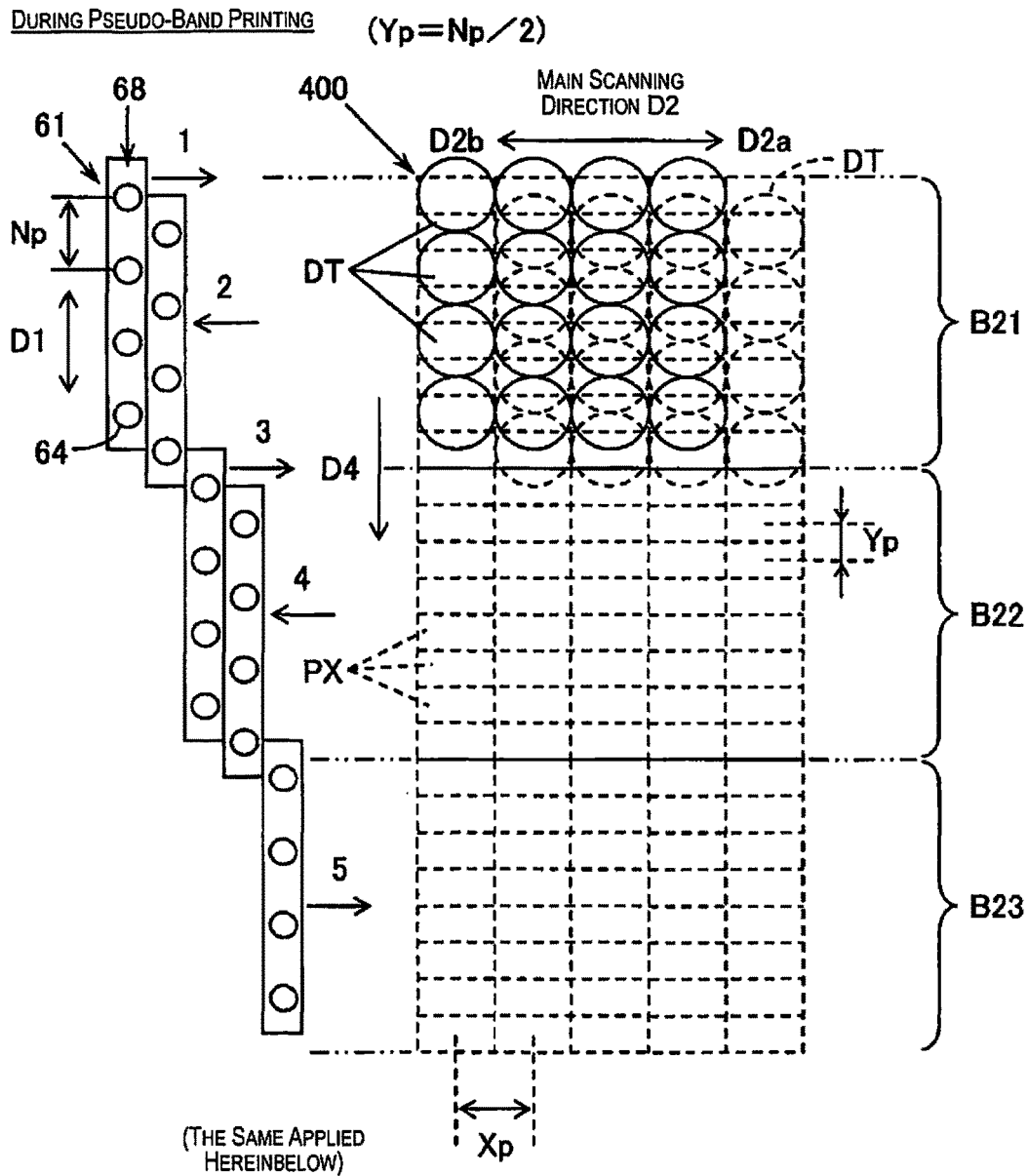
FIG. 8 is a drawing schematically illustrating an example of pseudo-band printing.

FIG. 8 schematically illustrates an example of pseudo-band printing (the second scan setting 542). Herein, as well, for the purpose of description that is easy to understand, the recording head 61 is understood to be one where there exists only one nozzle column 68 in which N=4 nozzles 64 are arranged side by side in the alignment direction D1. The pseudo-band printing is a printing format in which all of the dots amounting to one band, corresponding to the alignment of the plurality of nozzles 64, are formed by moving the recording head 61 two or more rounds in a relative manner in the main scanning direction D2 with respect to the recording substrate 400. The example in FIG. 8 illustrates forming the dots DT that need to be formed with respect to half of the pixels PX included in a band B21 in a first round of main scanning that is the forward direction D2a, feeding the recording substrate 400 by a distance commensurate with ½ the nozzle pitch Np, thereafter forming the dots DT that need to be formed with respect to the remaining half of pixels included in the band B21 in a second round of main scanning that is the return direction D2b, feeding the recording substrate 400 by a distance commensurate with (N−(½))×Np, thereafter forming the dots DT that need to be formed with respect to half of the pixels PX included in a band B22 in a third round of main scanning that is the forward direction D2a, feeding the recording substrate 400 by a distance of (½)×Np, thereafter forming the dots DT that need to be formed with respect to the remaining half of pixels included in the band B22 in a fourth round of main scanning that is the return direction D2b, feeding the recording substrate 400 by a distance commensurate with (N−(½))×Np, thereafter forming the dots DT that need to be formed with respect to half of the pixels PX included in a band B23 in a fifth round of main scanning that is the forward direction D2a, and so forth. In a case where unidirectional printing is being carried out, it would suffice for the dot formation of both odd-numbered rounds and even-numbered rounds to be carried out solely in the main scanning of the forward direction D2a. The pixel pitch Yp of the secondary scanning direction D4 during the pseudo-band printing will be, for example, (½)×Np. S206 in FIG. 5 illustrates the pixel pitch Yp as being 1200 dpi equivalence. The same is also true of a case where all of the dots amounting to one band are formed by moving the recording head in three or more rounds in a relative manner in the main scanning direction.

Figure 9:
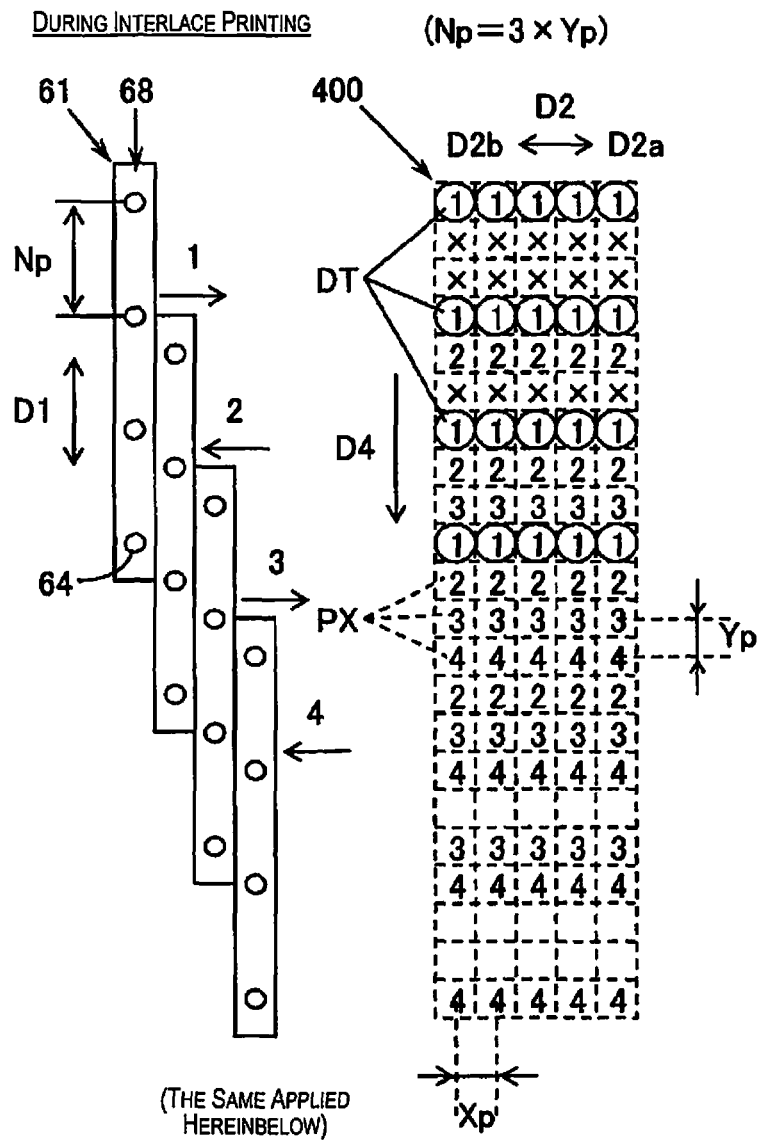
FIG. 9 is a drawing schematically illustrating an example of interlace printing.

Printing formats also include interlace printing, which is illustratively exemplified in FIG. 9, and the like. Interlace printing is a printing format in which ink droplets that are discharged from nozzles 64 that are adjacent in the alignment direction D1 are made to land on pixels PX that are not adjacent in the secondary scanning direction, and ink droplets are made to land in later main scanning on the pixels PX in between, in positions where ink droplets did not land. In the drawing, the numbers assigned to the pixels PX are indicative of the ordinal number of the round of main scanning in which the dots DT are formed on the pixels PX. The example in FIG. 9 illustrates forming the dots DT on the recording substrate 400 at a pitch three times the pixel pitch Yp in a first round of main scanning that is the forward direction D2, feeding the recording substrate 400 by a distance commensurate for four times the pixel pitch Yp, thereafter forming the dots DT on the recording substrate 400 in a second round of main scanning that is the return direction D2b, feeding the recording substrate 400 by a distance commensurate with four times the pixel pitch Yp, thereafter forming the dots DT on the recording substrate 400 at a pitch three times the pixel pitch Yp in a third round of main scanning that is the forward direction D2a, feeding the recording substrate 400 by a distance commensurate with four times the pixel pitch Yp, thereafter forming the dots DT on the recording substrate 400 in a fourth round of main scanning that is the return direction D2b, and so forth. In a case where unidirectional printing is being carried out, it would suffice for the dot formation of both odd-numbered rounds and even-numbered rounds to be carried out solely in the main scanning of the forward direction D2a. The nozzle pitch Np illustrated in FIG. 9 is 3×Yp. As such, though the wind rippling phenomenon is relatively minor, composite black may be added to the high-recording-density K when the wind rippling seems more conspicuous in association with a higher resolution, and composite black may be added to the high-recording-density K when high-density dots are being formed and yet the underlying color of the recording substrate seems more conspicuous.

The LUTi for monochrome images, as illustrated in FIG. 10, includes a LUT k representative of not using the CMY ink, but also includes a LUTco representing of using the CMY ink in the high-recording-density K. The numerical values illustrated in FIG. 10 are merely schematic illustrative examples for facilitating understanding of the description. For example, the default LUT1 is a LUT k representative of not using the CMY ink while also prescribing relationships of correspondence between amounts of RGB used (gradation values) and amounts of CMYK ink used (gradation values). Herein, the amount of K ink used signifies the recording density of K with respect to the recording substrate 400. The beauty LUT2 also is a LUT k representative of not using CMYK ink, only differing from the default LUT1 in the relationships of correspondence between the RGB values and K values. The high-coloring LUT3, however, is a LUT co defining relationships of correspondence between amounts of RGB used (gradation values) and amounts of CMYK used (gradation values) so that the CMY inks are used when the amount of K ink used is a predetermined about (a predetermined density Tc %) or higher.

FIG. 11 schematically illustrates an example of the amounts of CMY used (amount of CMY ink used) with respect to the amount of K used (amount of K ink used) in the high-coloring LUT3. In the drawing, the thin solid line indicates the amount of C used with respect to the amount of K used, the single-dot chain line indicates the amount of M used with respect to the amount of K used, the two-dot chain line indicates the amount of Y used with respect to the amount of K used, and the thick solid line indicates the mean amount of CMY used with respect to the amount of K used. As illustrated in FIG. 11, it will be readily understood that the amounts of CMY used occurs when the amount of K used is Tc % or higher; when the amount of K used is less than Tc %, then the amounts of CMY used do not occur. The predetermined density Tc, serving as a boundary, is understood to be 60 to 70%, but may be set to, for example, about 50 to 80%.

The amount of C used, the amount of M used, and the amount of Y used are also understood to be less than Tc %, at most being about 40% or lower in the example in FIG. 11). The phenomenon of "wind rippling", in which the air flow caused by other ink droplets 67co having been discharged in the vicinity causes the ink droplets 67co to drift somewhat, is thereby suppressed for CMY, and the CMY ink droplets 67co are thereby made to land on the portions of underlying color of the recording substrate 400 caused by the wind rippling phenomenon of when only the K ink is used. As such, the wind rippling is effectively suppressed and a monochrome image of favorable image quality is obtained.

Moreover, the amounts of CMY used are understood to be upwardly convex curves in the case where the amount of K used is Tc % or higher. The conspicuousness of the underlying color of the recording substrate due to the wind rippling phenomenon is often connected so as to undulate in the main scanning direction D2, and therefore the conspicuousness of the underlying color of the recording substrate due to the wind rippling phenomenon is effectively suppressed by when the amounts of CMY used increase more than a rectilinear increase when the amount of K used reaches Tc % and higher.

The proportions of the amount of C used, the amount of M used, and the amount of Y used may be understood to be 1:1:1, as per the high-coloring LUT3 illustrated in FIG. 10, or may be varied, as illustrated in FIG. 11, depending on the nature of the inks and the like.

When the LUTi used in S204 to S208 in FIG. 5 is set, the controller 10 acquires the pixel values (Ri, Gi, Bi) of pixels PX1i intended to be color-converted from among the pixels PX1 that constitute the input data 300, as illustrated in FIG. 1 (S210). In S212, the LUTi that has been set is consulted, and input pixel values (Ri, Gi, Bi) are thereby converted into output pixel values (Ci, Mi, Yi, Ki); the pixel values (Ci, Mi, Yi, Ki) are then stored in intended pixels PX2 for the recording data 310. In a case where the pixel values (Ri, Gi, Bi) have not been stored in the LUTi, the output pixel values (Ci, Mi, Yi, Ki) may be interpolated by using a plurality of sets of amounts of CMYK ink used corresponding to used amounts close to the pixel values (Ri, Gi, Bi) out of the amounts of RGB used that have been stored in the LUTi. In S214, a determination is made as to whether or not the process for converting the pixel values has been carried out for all of the pixels PX1 of the input data 300. In a case where unprocessed pixels PX1 remain, then the image formation apparatus 1 repeats the processes in S210 to S214.

Repeating these processes causes storage of the output pixel values (Ci, Mi, Yi, Ki) of intended pixels PX2$i$ that need to be set, in sequential order from among the plurality of pixels PX2 of the recording data 310. In a case where the process for converting the pixel values has indeed been carried out for all of the pixels PX1, however, then the image formation apparatus 1 concludes the color conversion process. Thereafter, the controller 10 carries out the processes in S108 to S112 in FIG. 4, and forms the monochrome image 330 on the recording substrate 400 by discharging the ink droplets 67 from the plurality of nozzles 64 on the basis of the recording data 310.

(4) Actions and Effects

Herein, when the amount of K used as represented in the recording data 310 is less than the predetermined amount (Tc), i.e., when the recording density of the K ink is less than the predetermined density, then the CMY ink droplets 67$co$ are not discharged and the CMY dots Dco are not formed, as illustrated in the portion "When recording density is low" in FIG. 1. When the amount of K used is small, then the wind rippling phenomenon is not observed, due also to the facts that the air flow due to nearby ink droplet discharge has little effect and that there is more of the underlying color of the recording substrate. As such, when the amount of K used is small, than a printed image of favorable image quality can be obtained even without the use of the CMY inks.

In turn, when the amount of K used as represented in the recording data 310 is the predetermined amount (Tc) or higher, i.e., when the recording density of the K ink is the predetermined density or higher, then the CMY ink droplets 67$co$ that produce composite black are discharged and the CMY dots Dco are formed, as illustrated in the portion "When recording density is high" in FIG. 1. When the amount of K used is large, then the air flow due to nearby ink droplet discharge has a major effect, and with solely the K ink, the wind rippling phenomenon is sometimes produced. Discharging the CMY ink droplets 67$co$ makes it possible for the amount of ink used to increase up to a maximum of 400%, with the combination of CMYK. Discharging the CMY ink droplets 67$co$ causes the CMY dots Dco to form at the portions of underlying color of the recording substrate 400 caused by the wind rippling phenomenon, makes the underlying color of the recording substrate 400 less conspicuous, and suppresses the wind rippling. As such, the present technology is able to obtain a monochrome image of favorable image quality. When the amount of C used, the amount of M used, and the amount of Y used are at most less than Tc %, this suppresses the "wind rippling" phenomenon as regards the CMY dots Dco, and produces a monochrome image of favorable image quality with which the wind rippling has been effectively suppressed. In a case where the amount of CMY used is the amount of K used (Tc) or higher, having an upwardly convex curve also produces a monochrome image of favorable image quality with which the wind rippling has been effectively suppressed.

(5) Modification Examples

With the present invention, a variety of modification examples are conceivable.

For example, the image formation apparatuses to which the present invention can be applied include not only line printers and the like, but also copiers, facsimiles, and the like.

The aforementioned processes can be modified as appropriate, such as by switching the sequential order. For example, in the printing process of FIG. 4, the color conversion process may be carried out before the resolution conversion process.

The process for adding the CMY ink droplets in a case where the recording density of the K ink is the predetermined density or higher can also be carried out using as the recording data the multivalued data after the halftone process, beyond just the color conversion process, and can also be carried out using as the recording data the raster data after the rasterization process.

The embodiment described above switched between the case where the CMY ink droplets were added during the monochrome image printing and the case where the CMY ink droplets were not added, but the present invention would also encompass modes where the CMY ink droplets are added at all times in a case where the recording density of the K ink is the predetermined density or higher.

The ink is not limited to being a liquid for rendering colors, but also encompasses a variety of liquids for applying some kind of function, such as a non-colorant liquid for producing a perceived glossiness. As such, the ink droplets encompass a variety of liquid droplets, such as non-coloring liquid droplets.

Figure 12A:
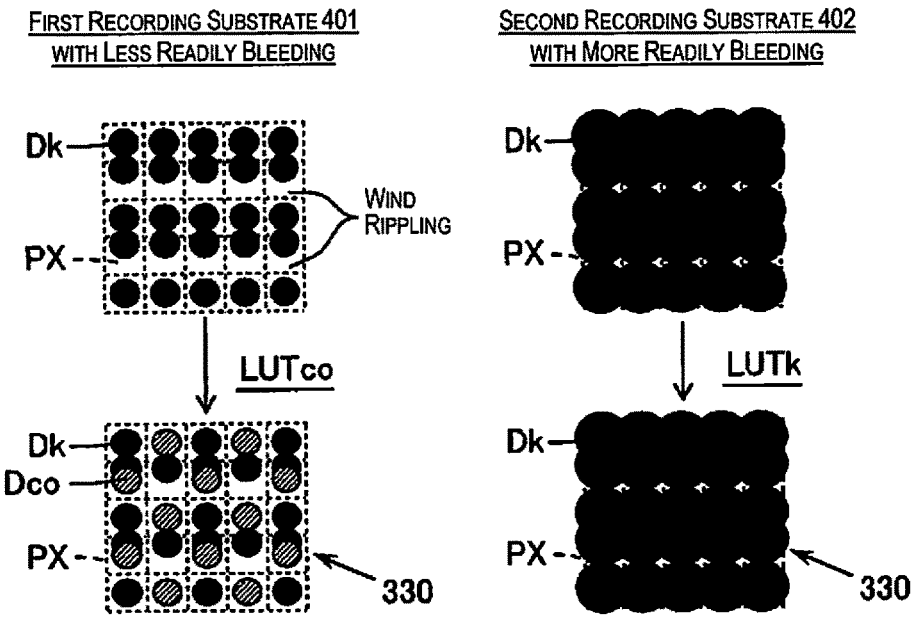
FIGS. 12A and 12B are drawings schematically illustrating an example where a proportion at which composite black is added is changed according to a printing substrate setting.

(5-1) Example where the Process is Changed in Accordance with the Type of Recording Substrate The recording substrate encompasses ones comparatively less likely to have ink bleeding, as with glossy paper, and ones comparatively more likely to have ink bleeding, as with recycled paper. As illustrated in FIG. 12A, the consequence of having smaller dots Dk in the first recording substrate 401 (for example, glossy paper) less likely to have ink bleeding is that even though the high-density dots Dk are formed, the underlying color of the recording substrate 401 is easy to see and the wind rippling is more likely to be conspicuous. In turn, the consequence of having larger dots Dk in the second recording substrate 402 (for example, recycled paper), which is more likely to have ink bleeding, is that when the high-density dots Dk are formed, the underlying color of the recording substrate 402 is difficult to see and the wind rippling is less likely to be conspicuous. Therefore, in S102 in FIG. 4, the controller 10 (the recording substrate setting input unit U21) may acquire one recording substrate setting out of a plurality of recording substrate settings comprising the first recording substrate setting 521 for forming the monochrome image 330 on the first recording substrate 401 less likely to have ink bleeding and the second recording substrate setting 522 for forming the monochrome image 330 on the second recording substrate 402 more likely to have ink bleeding.

FIG. 12A illustrates an example of forming the monochrome image 330 without adding the color ink droplets 67$co$ to the K ink droplets 67$k$ when the second recording substrate setting 522 has been inputted. Herein, the aforementioned high-coloring LUT3 or the like can be used for the LUTco. For the LUTk, it would be possible to use the aforementioned default LUT1 or the like. In S106 in FIG. 4, when the first recording substrate setting 521 has been inputted, the controller 10 consults the LUTco for which the CMY inks are used when the amount of K used is the predetermined amount (Tc) or higher and converts the RGB data (300) into the CMYK data (310). In the event that there is a large amount of K used in such a case, the image formation apparatus 1 forms the monochrome image 330 on the recording substrate 401 by discharging the K ink droplets 67$k$ from the K nozzles 64$k$ and, in addition thereto, also discharging the CMY ink 67*co* from the CMY nozzles 64*co*. This causes the underlying color of the recording substrate 401 to be inconspicuous and suppresses the wind rippling. When the second recording substrate setting 522 has been inputted, in turn, then the RGB data is converted to the CMYK data by consulting the LUTk in which the CMY ink is not used even when the amount of K used is the predetermined amount (Tc) or higher. In such a case, the image formation apparatus 1 uses only the K ink to form the monochrome image 330 on the recording substrate 402, even when there is a large amount of K used. This reduces the amount of CMY ink used.

Figure 12B:
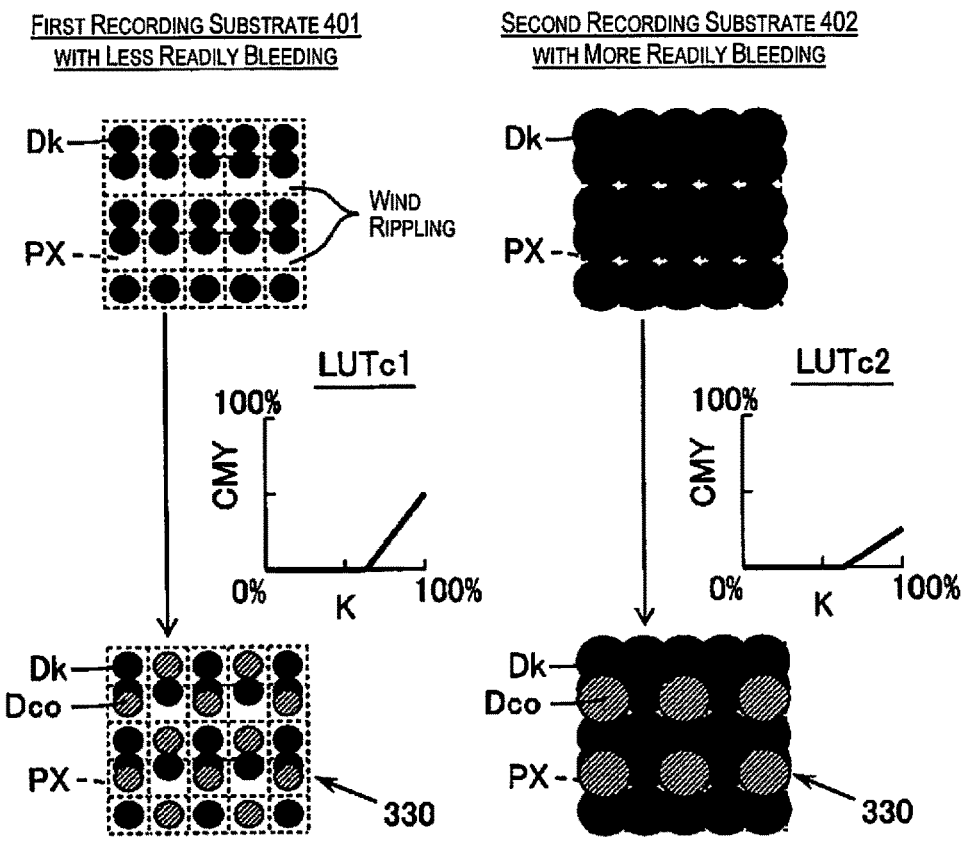

FIG. 12B illustrates an example of forming the monochrome image 330 by causing the proportion of the color ink droplets 67*co* added to the K ink droplets 67*k* when the second recording substrate setting 522 has been inputted to be less than when the first recording substrate setting 521 has been inputted. In S106 in FIG. 4, when the first recording substrate setting 521 has been inputted, then the controller 10 converts the RGB data (300) to the CMYK data (310) by consulting an LUTc1, in which comparatively more CMY ink droplets 670*co* are added in the amount of K used that is the predetermined amount (Tc) or higher. In such a case, the image formation apparatus 1 forms on the recording substrate 401 a monochrome image 330 similar to the case in FIG. 12A. This causes the underlying color of the recording substrate 401 to be inconspicuous and suppresses the wind rippling. When the second recording substrate setting 522 has been inputted, then the RGB data is converted to the CMYK data by consulting an LUTc2, in which comparatively fewer CMY ink droplets 67*co* are added in the amount of K used that is the predetermined amount (Tc) or higher. This reduces the amount of CMY ink used.

In either case, the conspicuousness of the underlying color of the recording substrate is efficiently suppressed, the wind rippling of the monochrome image is effectively suppressed, and the image quality of the monochrome image is improved.

Figure 13:
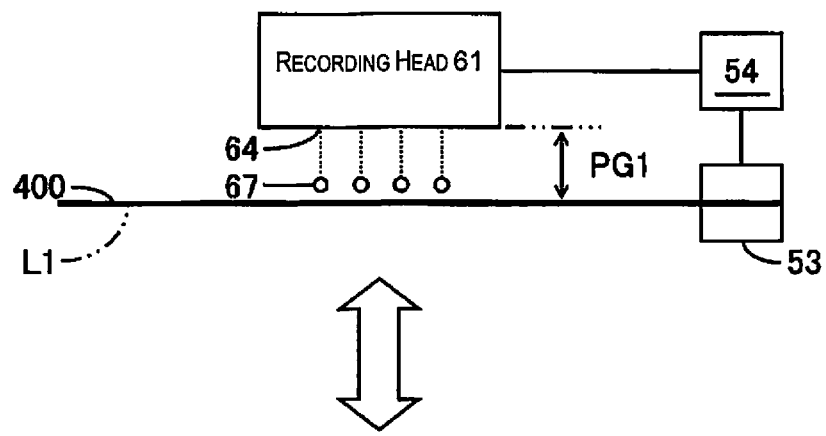
FIG. 13 is a drawing schematically illustrating an example of a distance from a plurality of nozzles 64 to a conveyance position L1 of a printing substrate 400.
Figure 13:
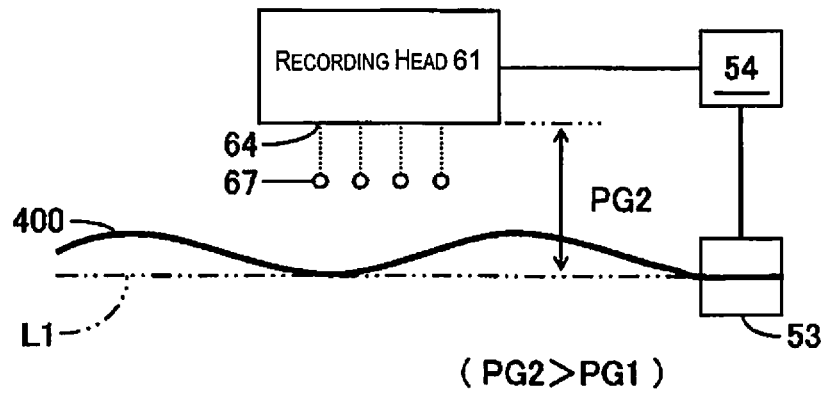

(5-2) Example where the Process is Changed in Accordance with the Distance from the Plurality of Nozzles to the Conveyance Position of the Recording Substrate FIG. 13 schematically illustrates an example of the distance PG (see FIG. 2) from the nozzle surface (plurality of nozzles 64) of the recording head 61 to the conveyance position L1 of the recording substrate 400. The conveyance position L1 of the recording substrate 400 is determined by the position of the paper feeding mechanism 53 (for example, a platen). Provided to the image formation apparatus is an interval adjustment mechanism 54 for adjusting the distance PG between the nozzle surface of the recording head 61 and the conveyance position L1 of the recording substrate 400.

In a case where two-sided printing is being carried out on the recording substrate 400, then in some instances there may arise a phenomenon where the recording substrate 400 undulates due to ink that has soaked in when the image is formed on the front side of the recording substrate 400. In such a case, when there is a short distance between the nozzle surface and the conveyance position L1, then there arises the possibility that the nozzle surface and the recording substrate 400 could come into contact, resulting in fouling, when the image is formed on the reverse side of the recording substrate 400. In turn, when there is a long distance between the nozzle surface and the conveyance position L1 in a case where the printing is being carried out on only one side of the recording substrate 400, then the air flow due to nearby droplet discharge has a major effect and the wind rippling phenomenon is more likely to occur. Therefore, in S102 in FIG. 4, the controller 10 (interval setting input unit U22) may acquire one interval setting out of a plurality of interval settings comprising a one-sided printing setting (the first interval setting 531) indicating that the distance from the plurality of nozzles 64 to the conveyance position L1 of the recording substrate 400 is the first distance PG1, and a two-sided printing setting (the second interval setting 532) indicating that the distance from the plurality of nozzles 64 to the conveyance position L1 of the recording substrate 400 is the second distance PG2 that is longer than the first distance PG1.

Figure 14A:
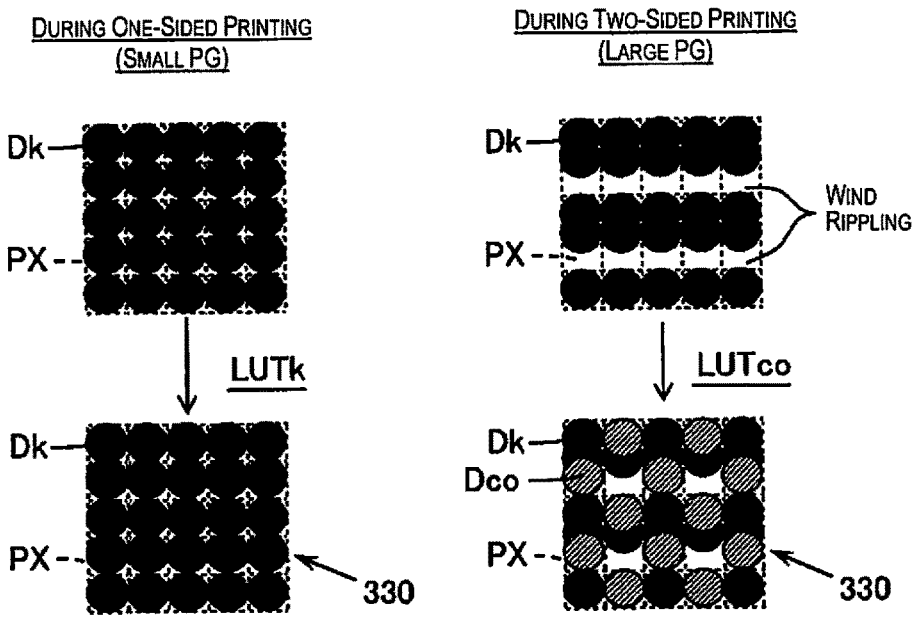
FIGS. 14A and 14B are drawings schematically illustrating an example where a proportion at which composite black is added is changed according to an interval setting.

FIG. 14A illustrates an example of forming the monochrome image 330 without adding the color ink droplets 67*co* to the K ink droplets 67*k* when the one-sided printing setting has been inputted. Herein, the aforementioned high-coloring LUT3 or the like can be used for the LUTco. For the LUTk, it would be possible to use the aforementioned default LUT1 or the like. In S106 in FIG. 4, when the two-sided printing setting (the second interval setting 532) has been inputted, then the controller 10 converts the RGB data (300) to the CMYK data (310) by consulting the LUTco, in which the CMY inks are used when the amount of K used is the predetermined amount (Tc) or higher. In such a case, where there is a large amount of K used, the image formation apparatus 1 forms the monochrome image 330 on the recording substrate 401 by discharging the K ink droplets 67*k* from the K nozzles 64*k* and, in addition thereto, also discharging the CMY ink 67*co* from the CMY nozzles 64*co*. This causes the underlying color of the recording substrate 400 to be inconspicuous and suppresses the wind rippling. When the one-sided printing setting (the first interval setting 531) has been inputted, however, then the RGB data is converted to the CMYK data by consulting the LUTk in which the CMY ink is not used even when the amount of K used is the predetermined amount (Tc) or higher. In such a case, the image formation apparatus 1 uses only the K ink to form the monochrome image 330 on the recording substrate 400, even when there is a large amount of K used. This reduces the amount of CMY ink used.

Figure 14B:
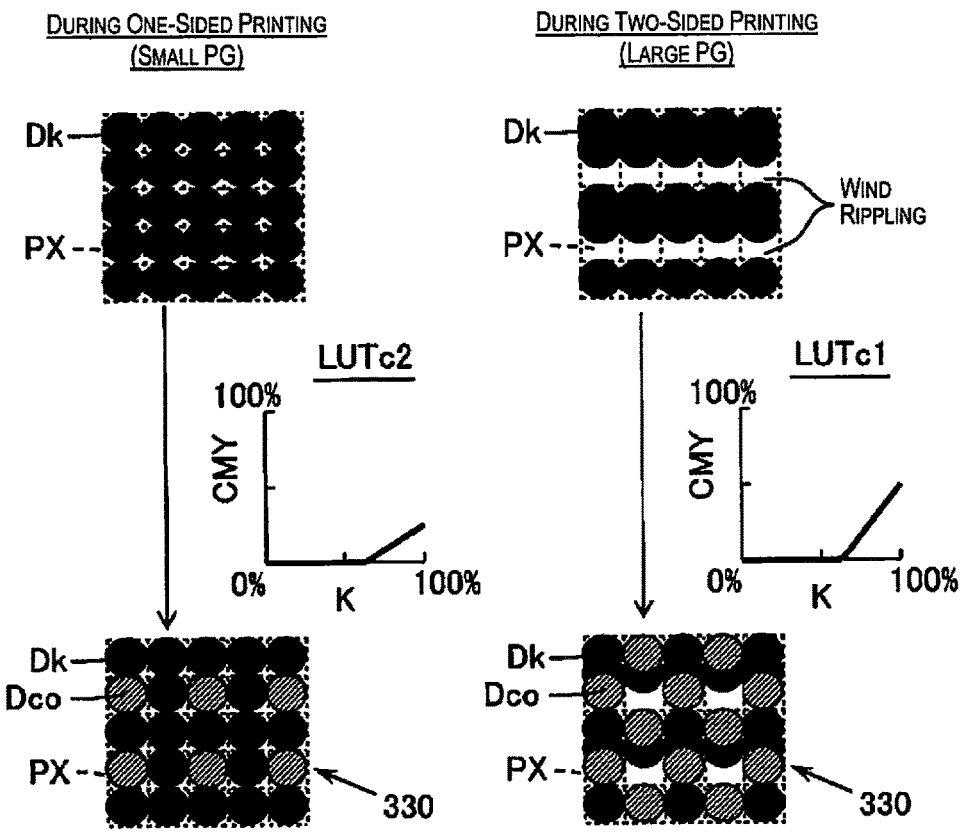

FIG. 14B illustrates an example of forming the monochrome image 330 by causing the proportion of the color ink droplets 67*co* added to the K ink droplets 67*k* when the one-sided printing setting has been inputted to be less than when the two-sided printing setting has been inputted. In S106 in FIG. 4, when the two-sided printing setting (the second interval setting 532) has been inputted, then the controller 10 converts the RGB data (300) to the CMYK data (310) by consulting the LUTc1, in which comparatively more CMY ink droplets 670*co* are added in the amount of K used that is the predetermined amount (Tc) or higher. In such a case, the image formation apparatus 1 forms on the recording substrate 400 a monochrome image 330 similar to the case in FIG. 14A. This causes the underlying color of the recording substrate 400 to be inconspicuous and suppresses the wind rippling. When the one-sided printing setting (the first interval setting 531) has been inputted, then the RGB data is converted to the CMYK data by consulting the LUTc2, in which comparatively fewer CMY ink droplets 67*co* are added in the amount of K used that is the predetermined amount (Tc) or higher. This reduces the amount of CMY ink used.

In either case, the conspicuousness of the underlying color of the recording substrate is efficiently suppressed, the wind rippling of the monochrome image is effectively suppressed, and the image quality of the monochrome image is improved.

(5-3) Example where the Process is Changed in Accordance with the Scan Setting

The scan setting 540 encompasses the band printing setting (the first scan setting 541) such as is illustrated in FIG. 7, and the pseudo-band printing setting (the second scan setting 542) such as is illustrated in FIG. 8. In a case where band printing is being carried out, the wind rippling phenomenon may occur in some instances when the air flow affects the landing of the ink droplets, because all of the dots amounting to one band are formed by moving the recording head 61 one round in a relative manner with respect to the recording substrate 400, as illustrated in FIG. 7. In a case where pseudo-band printing is being carried, then even when the landing of the ink droplets is affected by the air flow, the second or later rounds of relative movement of the nozzles causes the portion of underlying color of the recording substrate 400 to be covered with dots, thus suppressing the wind rippling phenomenon, because all of the dots amounting to one band are formed by moving the recording head 61 two or more rounds in a relative manner with respect to the recording substrate 400, as illustrated in FIG. 8. Therefore, in S102 in FIG. 4, the controller 10 (scan setting input unit U23) may acquire one scan setting from among a plurality of scan settings comprising the band printing setting and the pseudo-band printing setting.

Figure 15A:
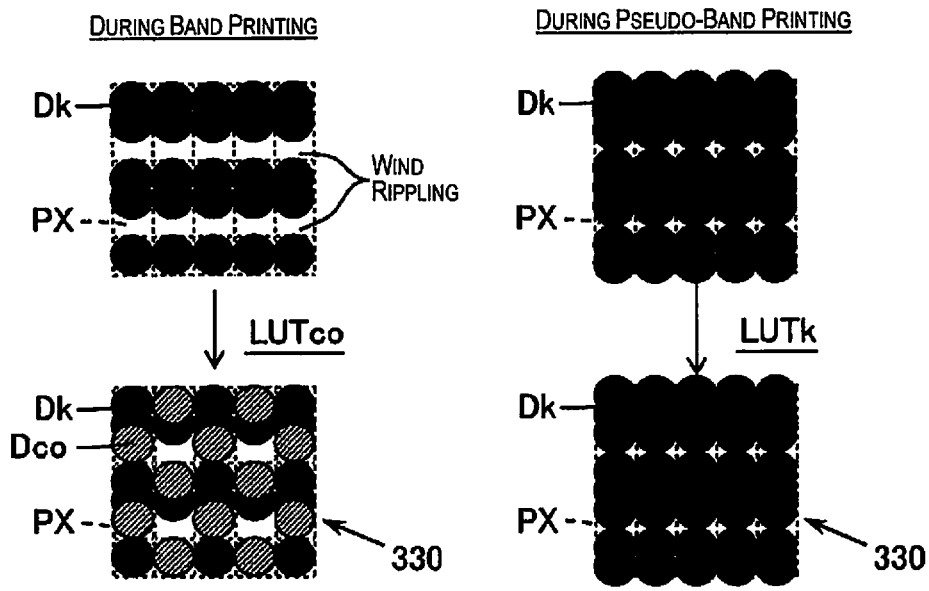
FIGS. 15A and 15B are drawings schematically illustrating an example where a proportion at which composite black is added is changed according to a scan setting.

FIG. 15A illustrates an example of forming the monochrome image 330 without adding the color ink droplets 67co to the K ink droplets 67k when the pseudo-band printing setting has been inputted. Herein, the aforementioned high-coloring LUT3 or the like can be used for the LUTco. For the LUTk, it would be possible to use the aforementioned default LUT1 or the like. In S106 in FIG. 4, when the band printing setting (the first scan setting 541) has been inputted, then the controller 10 converts the RGB data (300) to the CMYK data (310) by consulting the LUTco, in which the CMY inks are used when the amount of K used is the predetermined amount (Tc) or higher. In such a case, when there is a large amount of K used, the image formation apparatus 1 forms the monochrome image 330 on the recording substrate 401 by discharging the K ink droplets 67k from the K nozzles 64k and, in addition thereto, also discharging the CMY ink 67co from the CMY nozzles 64co. This causes the underlying color of the recording substrate 400 to be inconspicuous and suppresses the wind rippling. When the pseudo-band printing setting (the second scan setting 542) has been inputted, however, then the RGB data is converted to the CMYK data by consulting the LUTk in which the CMY ink is not used even when the amount of K used is the predetermined amount (Tc) or higher. In such a case, the image formation apparatus 1 uses only the K ink to form the monochrome image 330 on the recording substrate 400, even when there is a large amount of K used. This reduces the amount of CMY ink used.

Figure 15B:
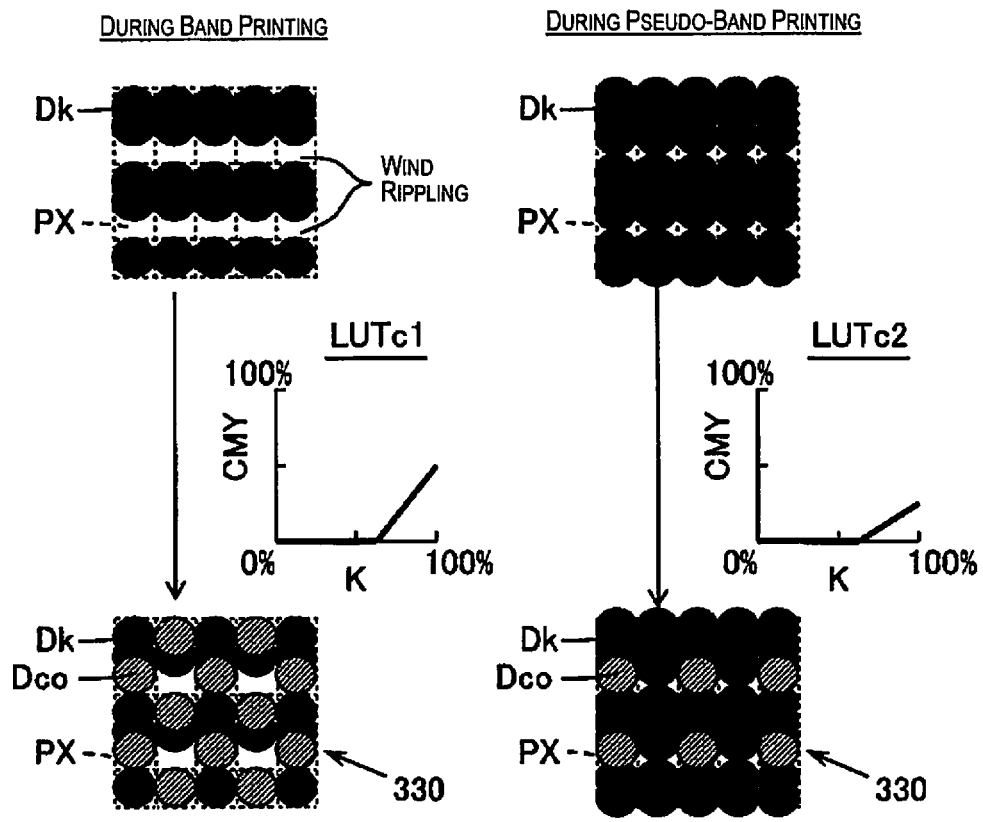

FIG. 15B illustrates an example of forming the monochrome image 330 by causing the proportion of the color ink droplets 67co added to the K ink droplets 67k when the pseudo-band printing setting has been inputted to be less than when the band printing setting has been inputted. In S106 in FIG. 4, when the band printing setting (the first scan setting 551) has been inputted, then the controller 10 converts the RGB data (300) to the CMYK data (310) by consulting the LUTc1, in which comparatively more CMY ink droplets 670co are added in the amount of K used that is the predetermined amount (Tc) or higher. In such a case, the image formation apparatus 1 forms on the recording substrate 400 a monochrome image 330 similar to the case in FIG. 15A. This causes the underlying color of the recording substrate 400 to be inconspicuous and suppresses the wind rippling. When the pseudo-band printing setting (the second scan setting 542) has been inputted, then the RGB data is converted to the CMYK data by consulting the LUTc2, in which comparatively fewer CMY ink droplets 67co are added in the amount of K used that is the predetermined amount (Tc) or higher. This reduces the amount of CMY ink used.

In either case, the conspicuousness of the underlying color of the recording substrate is efficiently suppressed, the wind rippling of the monochrome image is effectively suppressed, and the image quality of the monochrome image is improved.

As the second scan setting 542, a setting for carrying out interlace printing such as is illustrated in FIG. 9 or the may be set.

(5-4) Example where the Process is Changed in Accordance with Scan Setting in the Relative Movement Direction In a case where the monochrome image 330 is formed at a comparatively high resolution (for example, 1200 dpi) in the main scanning direction D2, then the ink droplets have a high discharge frequency, and therefore in some instances the air flow may affect the landing of the ink droplets and the wind rippling phenomenon may arise. In a case where the monochrome image 330 is formed at a comparatively low resolution (for example, 600 dpi) in the main scanning direction D2, then the ink droplets have a lower discharge frequency, and therefore the landing of the ink droplets is less affected by the air flow and the wind rippling phenomenon is less likely to occur. Therefore, in S102 in FIG. 4, the controller 10 (the resolution setting input unit U24) may acquire one resolution setting out of a plurality of resolution settings comprising a low-resolution setting (the first resolution setting 551) for forming the monochrome image 330 at the first resolution in the main scanning direction D2 of the recording head 61, and a high-resolution setting (the second resolution setting 552) for forming the monochrome image 330 at the second resolution higher than the first resolution in the relative movement direction D2.

Figure 16A:
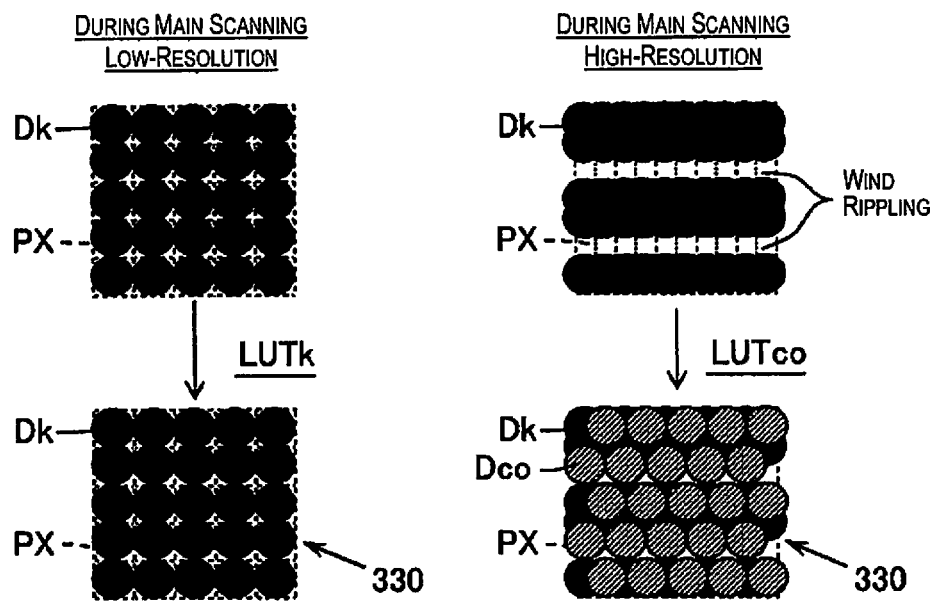
FIGS. 16A and 16B are drawings schematically illustrating an example where a proportion at which composite black is added is changed according to a resolution setting.

FIG. 16A illustrates an example of forming the monochrome image 330 without adding the color ink droplets 67co to the K ink droplets 67k when the low-resolution setting has been inputted. Herein, the aforementioned high-coloring LUT3 or the like can be used for the LUTco. For the LUTk, it would be possible to use the aforementioned default LUT1 or the like. In S106 in FIG. 4, when the high-resolution setting (the second resolution setting 552) has been inputted, then the controller 10 converts the RGB data (300) to the CMYK data (310) by consulting the LUTco, in which the CMY inks are used when the amount of K used is the predetermined amount (Tc) or higher. In such a case, where there is a large amount of K used, the image formation apparatus 1 forms the monochrome image 330 on the recording substrate 401 by discharging the K ink droplets 67k from the K nozzles 64k and, in addition thereto, also discharging the CMY ink 67co from the CMY nozzles 64co. This causes the underlying color of the recording substrate 400 to be inconspicuous and suppresses the wind rippling. When the low-resolution setting (the first resolution setting 551) has been inputted, however, then the RGB data is converted to the CMYK data by consulting the LUTk in which the CMY ink is not used even when the amount of K used is the predetermined amount (Tc) or higher. In such a case, the image formation apparatus 1 uses only the K ink to form the monochrome image 330 on the recording substrate 400, even when there is a large amount of K used. This reduces the amount of CMY ink used.

Figure 16B:
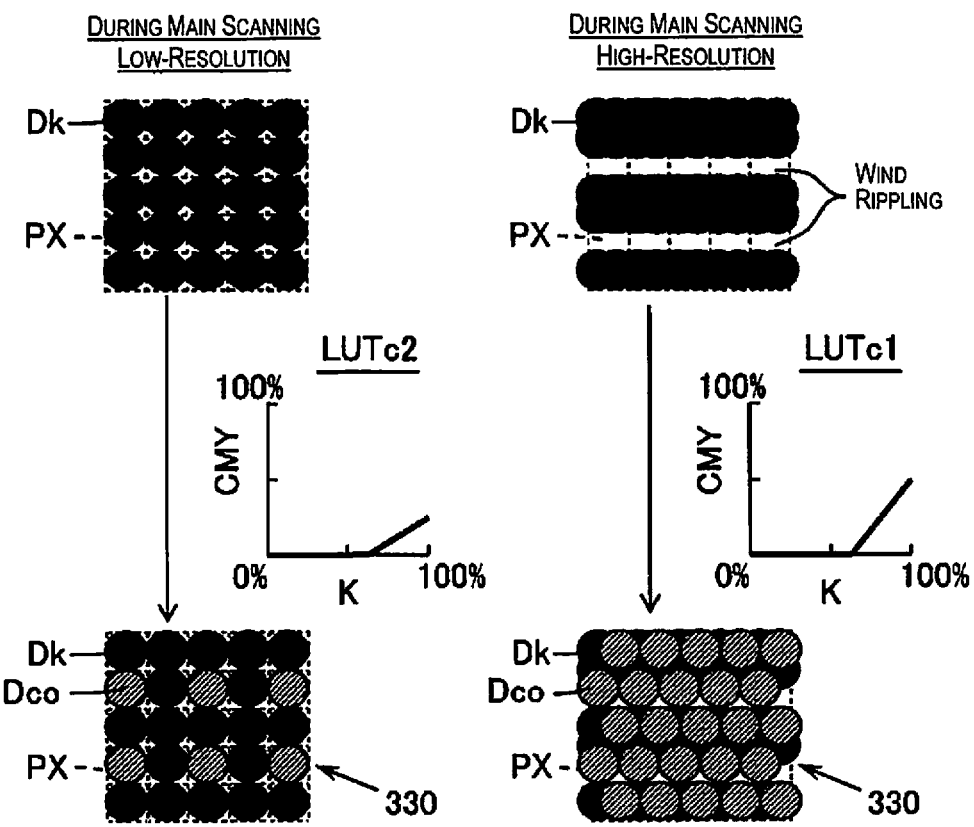

FIG. 16B illustrates an example of forming the monochrome image 330 by causing the proportion of the color ink droplets 67co added to the K ink droplets 67k when the low-resolution setting has been inputted to be less than when the high-resolution setting has been inputted. In S106 in FIG. 4, when the high-resolution setting (the second resolution setting 552) has been inputted, then the controller 10 converts the RGB data (300) to the CMYK data (310) by consulting the LUTc1, in which comparatively more CMY ink droplets 670co are added in the amount of K used that is the predetermined amount (Tc) or higher. In such a case, the image formation apparatus 1 forms on the recording substrate 400 a monochrome image 330 similar to the case in FIG. 16A. This causes the underlying color of the recording substrate 400 to be inconspicuous and suppresses the wind rippling. When the low-resolution setting (the first resolution setting 551) has been inputted, then the RGB data is converted to the CMYK data by consulting the LUTc2, in which comparatively fewer CMY ink droplets 67co are added in the amount of K used that is the predetermined amount (Tc) or higher. This reduces the amount of CMY ink used.

In either case, the conspicuousness of the underlying color of the recording substrate is efficiently suppressed, the wind rippling of the monochrome image is effectively suppressed, and the image quality of the monochrome image is improved.

Because the level of the resolution is relative, another example may be that the high-resolution setting is a setting for forming the image at 600 dpi and the low-resolution setting is a setting for forming the image at 300 dpi.

(6) Conclusion

As described above, according to the present invention, the various embodiments make it possible to provide a technology and the like with which it is possible to improve the image quality of a monochrome image. It shall be readily understood that the aforementioned fundamental actions and effects are still obtained with techniques that do not have the constituent requirements as in the dependent claims and consist solely of the constituent requirements as in the independent claims.

It would also be possible to implement a configuration where the respective configurations disclosed in the embodiment and modification examples described above are replaced by one another or the combinations are modified, or a configuration where publicly known technologies and the respective configurations disclosed in the embodiment and modification examples described above are replaced by one another or the combinations are modified, and the like. The present invention also includes these configuration, and the like.

GENERAL INTERPRETATION OF TERMS

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Finally, terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

While only a selected embodiment has been chosen to illustrate the present invention, it will be apparent to those skilled in the art from this disclosure that various changes and modifications can be made herein without departing from the scope of the invention as defined in the appended claims. Furthermore, the foregoing descriptions of the embodiment according to the present invention are provided for illustration only, and not for the purpose of limiting the invention as defined by the appended claims and their equivalents.

What is claimed is:

1. An image formation apparatus configured to form a monochrome image on a recording substrate by discharging ink droplets on the basis of recording data from a plurality of nozzles having black nozzles for discharging black ink droplets and color nozzles for discharging color ink droplets that produce composite black, the image formation apparatus comprising:
   a control unit configured to compare a recording density of black ink represented by the recording data with a predetermined density, and to form the monochrome image by discharging the black ink droplets from the black nozzles and discharging the color ink droplets that produce composite black from the color nozzles when the recording density of the black ink represented by the recording data is the predetermined density or higher,
   the control unit varying a proportion of the color ink droplets discharged from the color nozzles to produce composite black in accordance with a degree of bleeding of the ink in the recording substrate.

2. The image formation apparatus as set forth in claim 1, further comprising
   an interval setting input unit configured to input one interval setting out of a plurality of interval settings having a first interval setting indicating that a distance from the plurality of nozzles to a conveyance position of a recording substrate is a first distance, and a second interval setting indicating that a distance from the plurality of nozzles to the conveyance position of the recording substrate is a second distance that is longer than the first distance,
   when the first interval setting is inputted, the control unit forms the monochrome image either by causing a proportion of the color ink droplets coming from the color nozzles added to the black ink droplets coming from the black nozzles to be less than when the second interval setting is inputted, or without adding the color ink droplets.

3. The image formation apparatus as set forth in claim 1, further comprising
   a scan setting input unit configured to input one scan setting out of a plurality of scan settings having a first scan setting for forming all of the dots corresponding to one band corresponding to an alignment of the plurality of nozzles by moving the plurality of nozzles one round in a relative manner with respect to a recording substrate, and a second scan setting for forming all of the dots corresponding to one band corresponding to the alignment of the plurality of nozzles by moving the plurality of nozzles two or more rounds in a relative manner with respect to the recording substrate, when the second scan setting is inputted, the control unit forms the monochrome image either by causing a proportion of the color ink droplets coming from the color nozzles added to the black ink droplets coming from the black nozzles to be less than when the first scan setting is inputted, or without adding the color ink droplets.

4. The image formation apparatus as set forth in claim 1, further comprising a resolution setting input unit configured to input one resolution setting out of a plurality of resolution settings having a first resolution setting for forming the monochrome image at a first resolution in a relative movement direction of the plurality of nozzles with respect to a recording substrate, and a second resolution setting for forming the monochrome image at a second resolution higher than the first resolution in the relative movement direction, when the first resolution setting is inputted, the control unit forms the monochrome image either by causing a proportion of the color ink droplets coming from the color nozzles added to the black ink droplets coming from the black nozzles to be less than when the second resolution setting is inputted, or without adding the color ink droplets.

5. The image formation apparatus as set forth in claim 1, wherein the control unit consults a look-up table that prescribes a correspondence relationship between an used amount of input color and a recording density of ink discharged from the plurality of nozzles, the look-up table prescribing a correspondence relationship where composite black is added when the recording density of the black ink is the predetermined density or higher, converts input data represented with the input color into the recording data, and forms the monochrome image by discharging the ink droplets from the plurality of nozzles on the basis of the recording data.

6. An image formation apparatus configured to form a monochrome image on a recording substrate by discharging ink droplets on the basis of recording data from a plurality of nozzles having black nozzles for discharging black ink droplets and color nozzles for discharging color ink droplets that produce composite black, the image formation apparatus comprising:

a control unit configured to compare a recording density of black ink represented by the recording data with a predetermined density, and to form the monochrome image by discharging the black ink droplets from the black nozzles and discharging the color ink droplets that produce composite black from the color nozzles when the recording density of the black ink represented by the recording data is the predetermined density or higher; and a recording substrate setting input unit configured to input one recording substrate setting out of a plurality of recording substrate settings having a first recording substrate setting for forming the monochrome image on a first recording substrate and a second recording substrate setting for forming the monochrome image on a second recording substrate that has ink bleeding more readily than the first recording substrate, when the second recording substrate setting is inputted, the control unit forming the monochrome image either by causing a proportion of the color ink droplets coming from the color nozzles added to the black ink droplets coming from the black nozzles to be less than when the first recording substrate setting is inputted, or without adding the color ink droplets.

7. An image formation method for forming a monochrome image on a recording substrate by discharging ink droplets on the basis of recording data from a plurality of nozzles having black nozzles for discharging black ink droplets and color nozzles for discharging color ink droplets that produce composite black, the method comprising:

comparing recording density of black ink represented by the recording data with a predetermined density;

forming the monochrome image by discharging the black ink droplets from the black nozzles and discharging the color ink droplets that produce composite black from the color nozzles when the recording density of the black ink represented by the recording data is the predetermined density or higher; and varying a proportion of the color ink droplets discharged from the color nozzles to produce composite black in accordance with a degree of bleeding of the ink in the recording substrate.

\* \* \* \* \*